(12) United States Patent
Uchida

(10) Patent No.: US 11,392,671 B2
(45) Date of Patent: Jul. 19, 2022

(54) DELIVERY MANAGEMENT SERVER AND DELIVERY MANAGEMENT METHOD FOR DELIVERING UPDATED APPLICATION

(71) Applicant: CANON KABUSHIKI KAISHA, Tokyo (JP)

(72) Inventor: Momoe Uchida, Kamakura (JP)

(73) Assignee: Canon Kabushiki Kaisha, Tokyo (JP)

( * ) Notice: Subject to any disclaimer, the term of this patent is extended or adjusted under 35 U.S.C. 154(b) by 765 days.

(21) Appl. No.: 14/988,049

(22) Filed: Jan. 5, 2016

(65) Prior Publication Data

US 2016/0210709 A1 Jul. 21, 2016

(30) Foreign Application Priority Data

Jan. 21, 2015 (JP) .............................. JP2015-009740

(51) Int. Cl.
G06F 21/10 (2013.01)
G06F 21/60 (2013.01)
G06Q 50/18 (2012.01)

(52) U.S. Cl.
CPC ............ *G06F 21/10* (2013.01); *G06F 21/602* (2013.01); *G06Q 50/184* (2013.01); *G06Q 2220/18* (2013.01)

(58) Field of Classification Search
None
See application file for complete search history.

(56) References Cited

U.S. PATENT DOCUMENTS 7,080,043 B2 * 7/2006 Chase, Jr. ............... G06F 21/10
380/231
7,814,023 B1 10/2010 Rao et al.
7,865,445 B2 1/2011 Maeda
(Continued)

FOREIGN PATENT DOCUMENTS

CN 1449527 A * 10/2003 ............. G06F 21/51
CN 101114329 A 1/2008
(Continued)

OTHER PUBLICATIONS

Nima Zahadat et al. BYOD security engineering: A framework and its analysis, Computers & Security, vol. 55, 2015, pp. 81-99, www.sciencedirect.com/science/article/pii/S0167404815000978 (Year: 2015).*

(Continued)

*Primary Examiner* — El Mehdi Oussir
(74) *Attorney, Agent, or Firm* — Venable LLP

(57) ABSTRACT

An updated application is delivered to an appropriate delivery destination. A delivery management server receives, from an information processing device, application identification information for identifying the application and key information on the application. The received application identification information and key information are transmitted to a license management server and destination information indicative of the destination of the application is received from the license management server. The updated application is delivered to the specific delivery destination by managing the destination information in association with the application identification information and information for identifying the information processing device.

8 Claims, 21 Drawing Sheets

(56) References Cited

U.S. PATENT DOCUMENTS

| | | | | |
|---|---|---|---|---|
| 8,321,949 | B1* | 11/2012 | Green | G06F 21/51 |
| | | | | 707/687 |
| 8,395,797 | B2* | 3/2013 | Anno | H04N 1/00432 |
| | | | | 358/1.15 |
| 8,539,595 | B2 | 9/2013 | Tsuboi | |
| 8,831,995 | B2* | 9/2014 | Holler | G06F 8/65 |
| | | | | 705/51 |
| 8,856,318 | B2* | 10/2014 | Nakamoto | G06F 8/61 |
| | | | | 709/224 |
| 8,868,692 | B1* | 10/2014 | Khanna | H04N 21/25833 |
| | | | | 709/219 |
| 8,966,472 | B2 | 2/2015 | Hayami | |
| 9,699,195 | B2 | 7/2017 | Ito | |
| 10,417,432 | B2* | 9/2019 | Mahaffey | G06F 21/577 |
| 2007/0064268 | A1 | 3/2007 | Hino | |
| 2008/0027742 | A1* | 1/2008 | Maeda | G06F 21/105 |
| | | | | 705/1.1 |
| 2008/0178298 | A1* | 7/2008 | Arai | G06F 8/65 |
| | | | | 726/29 |
| 2009/0228982 | A1* | 9/2009 | Kobayashi | G06F 21/10 |
| | | | | 726/26 |
| 2009/0310179 | A1* | 12/2009 | Tamura | G03G 15/5075 |
| | | | | 358/1.15 |
| 2010/0058468 | A1* | 3/2010 | Green | G06F 21/51 |
| | | | | 726/22 |
| 2010/0242117 | A1* | 9/2010 | Tsuboi | G06F 21/10 |
| | | | | 726/26 |
| 2010/0293619 | A1 | 11/2010 | Hayami | |
| 2011/0276501 | A1 | 11/2011 | Sako et al. | |
| 2012/0210442 | A1 | 8/2012 | Ito | |
| 2012/0257240 | A1 | 10/2012 | Yuki | |
| 2013/0019233 | A1 | 1/2013 | Pardehpoosh et al. | |
| 2013/0019234 | A1 | 1/2013 | Pardehpoosh et al. | |
| 2013/0019237 | A1* | 1/2013 | Pardehpoosh | G06Q 30/0609 |
| | | | | 717/171 |
| 2013/0036160 | A1* | 2/2013 | Sasao | G06F 21/10 |
| | | | | 709/203 |
| 2013/0275553 | A1* | 10/2013 | Shilo | G06F 8/61 |
| | | | | 709/217 |
| 2014/0082608 | A1* | 3/2014 | Hayami | H04N 1/00965 |
| | | | | 717/175 |
| 2014/0258644 | A1* | 9/2014 | Stark | G06F 9/467 |
| | | | | 711/149 |
| 2014/0344846 | A1* | 11/2014 | Yamamura | H04N 21/2396 |
| | | | | 725/25 |
| 2015/0310354 | A1* | 10/2015 | Mahalingam | G06Q 10/00 |
| | | | | 705/59 |
| 2015/0317151 | A1* | 11/2015 | Falcy | H04L 67/10 |
| | | | | 717/173 |
| 2016/0099963 | A1* | 4/2016 | Mahaffey | H04L 63/0227 |
| | | | | 726/25 |
| 2016/0210709 | A1* | 7/2016 | Uchida | G06Q 50/184 |
| 2018/0059999 | A1* | 3/2018 | Kawakami | G06F 3/1203 |

FOREIGN PATENT DOCUMENTS

| | | | | | |
|---|---|---|---|---|---|
| CN | 101887377 | A | | 11/2010 | |
| CN | 102308301 | A | | 1/2012 | |
| CN | 102667790 | A | | 9/2012 | |
| CN | 102859529 | A | | 1/2013 | |
| CN | 103207793 | A | | 7/2013 | |
| CN | 103685824 | A | | 3/2014 | |
| CN | 104662864 | A | * | 5/2015 | G06F 21/34 |
| JP | 2005-215945 | A | | 8/2005 | |
| JP | 2010-211469 | A | | 9/2010 | |
| JP | 5182445 | B1 | * | 4/2013 | |
| JP | 2014106690 | A | * | 6/2014 | |
| WO | WO-2009108471 | A2 | * | 9/2009 | G07F 17/32 |
| WO | 2010/092655 | A1 | | 8/2010 | |
| WO | WO-2010092655 | A1 | * | 8/2010 | G06F 21/10 |

OTHER PUBLICATIONS

Mar. 16, 2016 European Search Report in European Patent Appln. No. 15202286.9.

Mar. 22, 2019 Chinese Official Action in Chinese Patent Appln. No. 201610041816.8.

Jul. 23, 2019 Chinese Official Action in Chinese Patent Appln. No. 201610041816.8.

Dec. 11, 2019 Chinese Official Action in Chinese Patent Appln. No. 201610041816.8.

* cited by examiner

FIG.10A

DELIVERY SETTING > TARGET DEVICE SEARCH — 1001

| TENANT ID | U001 — 1002 |
|---|---|

| SETTING TYPE | ◉ FW DELIVERY  ◉ PERIODIC UPDATE  ◉ APPLICATION DELIVERY — 1003 |
|---|---|
| DELIVERY CONDITION | ☑ NO SETTING  ☐ WAITING FOR COMUNICATION  ☐ NEW  ☐ WAITING FOR DELIVERY  ☐ DURING DELIVERY  ☐ DELIVERED<br>☐ DURING APPLICATION  ☐ COMPLETED  ☐ FAILURE  ☐ CANCELLED |

AppID: ABC1234 — 1005

[SEARCH] — 1006  [CANCEL] — 1007  1004

FIG.10B

APPLICATION DELIVERY SETTING > TARGET DEVICE SEARCH > RESULT — 1051

| | DEVICE ID — 1052 | App Version — 1053 | DESTINATION INFORMATION — 1054 |
|---|---|---|---|
| ☑ | AAA00500 — 1055 | 1.0 | JP |
| ☑ | AAA00501 — 1056 | 1.0 | JP |
| ☐ | AAA00502 — 1057 | 1.0 | EN |

1058

[DELIVERY SETTING]  [CANCEL] — 1059

| DEVICE ID | DELIVERY DATE | | | DELIVERY TIME | |
|---|---|---|---|---|---|
| AAA00500 | ☐ YEAR | ☐ MONTH | ☐ DAY | ☐ HOUR | ☐ MINUTE |
| AAA00501 | ☐ YEAR | ☐ MONTH | ☐ DAY | ☐ HOUR | ☐ MINUTE |

APPLICATION DELIVERY SETTING > DELIVERY SETTING REGISTRATION — 1201
1202 DEVICE ID
1203 DELIVERY DATE
1204 DELIVERY TIME
1205, 1206
1207 DELIVERY REGISTRATION
1208 CANCEL

FIG.12

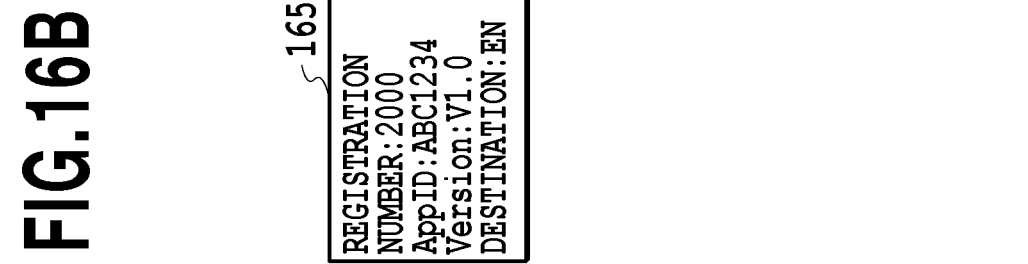
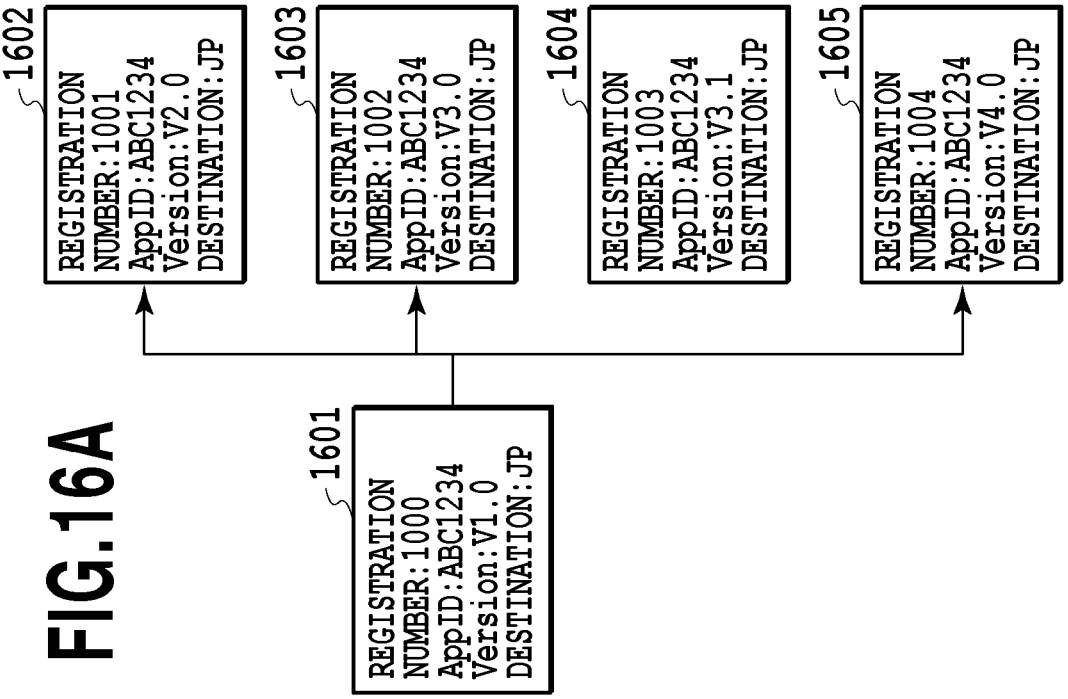

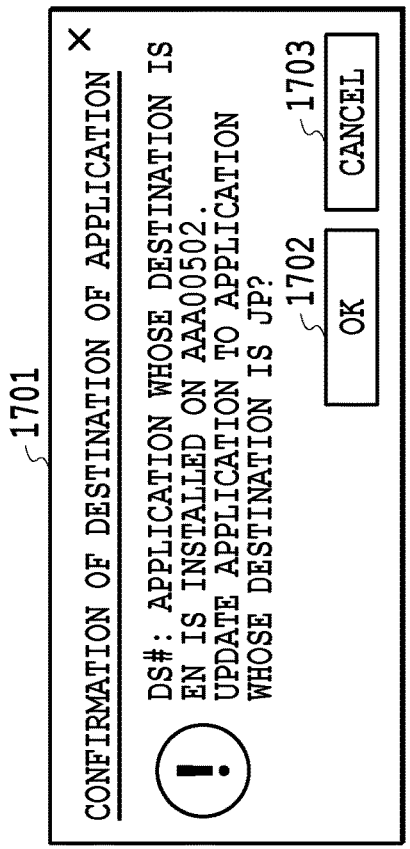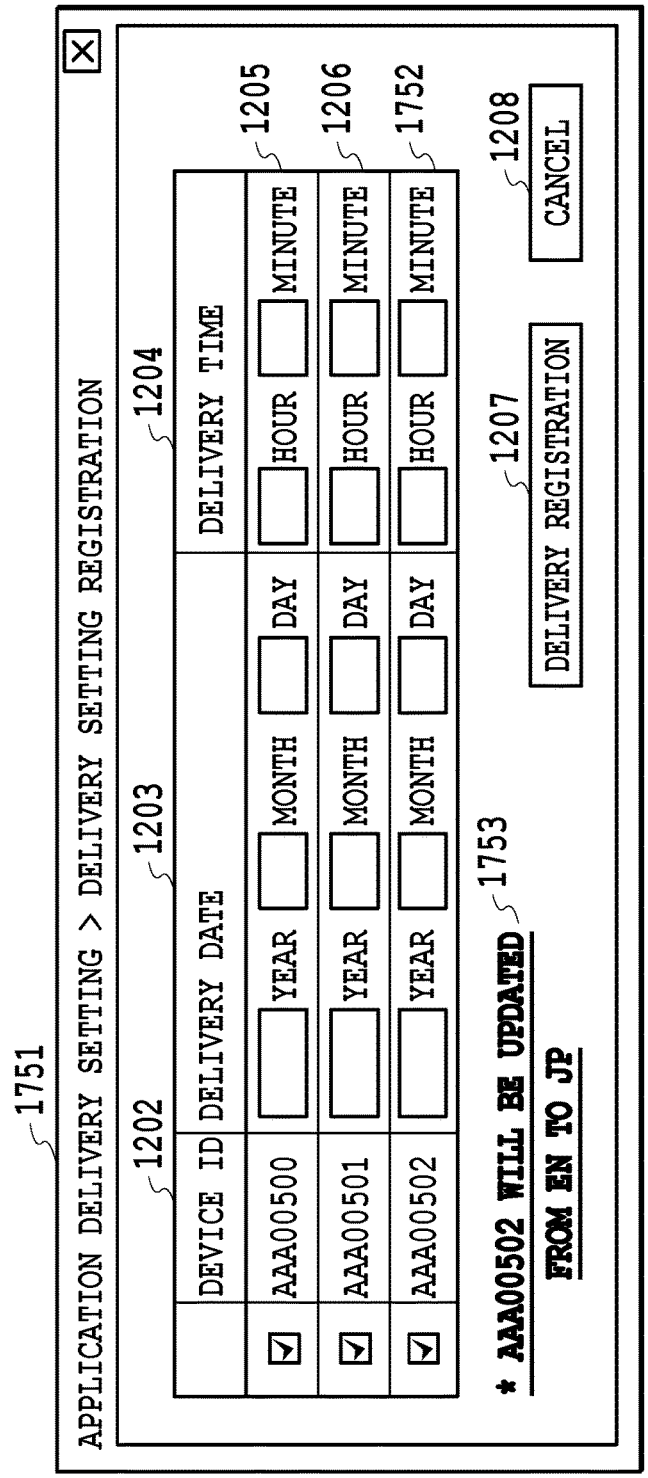

US 11,392,671 B2

DELIVERY MANAGEMENT SERVER AND DELIVERY MANAGEMENT METHOD FOR DELIVERING UPDATED APPLICATION

BACKGROUND OF THE INVENTION

Field of the Invention

The present invention relates to a technique of delivering an updated application to an appropriate delivery destination.

Description of the Related Art

Conventionally, there is known a technique of delivering an updated application to a device installing an old-version application. However, out of applications, even the same applications in the same version may have different "destinations." The "destination" is the delivery destination of the application, and the destinations fall into classifications, for example, "Japan," "Europe," and the like. More specifically, the destinations may be classified into groups according to a sales company selling devices.

Japanese Patent Laid-open No. 2005-215945 discloses a technique of making an application available only at a specific delivery destination. In Japanese Patent Laid-open No. 2005-215945, there is stored a license file including identification data on a manufacturer of a memory card. At the time of executing the application, the identification data on the manufacturer included in the license file is read by using an encryption key inside the application to specify an authentication key. This makes the application available only at the specific delivery destination.

However, the technique disclosed in Japanese Patent Laid-open No. 2005-215945 uses information included in the application to make the application available only at the specific delivery destination. Since the above "destination" is information which is not generally included in the application, the technique disclosed in Japanese Patent Laid-open No. 2005-215945 cannot deliver the application to the appropriate delivery destination.

SUMMARY OF THE INVENTION

In an aspect of the present invention, there is provided a delivery management server for managing delivery of an application connected via network to a license management server for managing a license of the application and an information processing device installing the application, the delivery management server comprising: a first receiving unit configured to receive, from the information processing device, application identification information for identifying the application and key information on the application; a managing unit configured to manage the application identification information and the key information received by the first receiving unit in association with device identification information on the information processing device; a first transmitting unit configured to transmit, to the license management server, the application identification information and the key information received by the first receiving unit; and a second receiving unit configured to receive destination information transmitted from the license management server in response to transmission by the first transmitting unit, the destination information indicating a destination of the application, wherein the managing unit manages the destination information received by the second receiving unit in association with the managed information.

Further features of the present invention will become apparent from the following description of exemplary embodiments (with reference to the attached drawings).

BRIEF DESCRIPTION OF THE DRAWINGS

FIGS. 10A and 10B are views showing a screen which is displayed by the delivery management server and which relates to target device search according to the embodiment;

FIG. 12 is a view showing a delivery registration screen displayed by the delivery management server according to the first embodiment;

FIGS. 16A and 16B are diagrams showing a relationship between applications managed by the related application information managing unit of the license management server according to the embodiment;

FIG. 17A is a view showing a destination confirmation screen displayed by the delivery management server according to a second embodiment;

FIG. 17B is a view showing a delivery registration screen displayed by the delivery management server according to the second embodiment;

DESCRIPTION OF THE EMBODIMENTS

With reference to the accompanying drawings, the present invention will be described in detail below based on preferred embodiments of the present invention. Incidentally, the features of the following embodiments are mere examples and the present invention is not limited to the illustrated features.

In subsequent descriptions, an application may be abbreviated as an app, and the word "app" is synonymous with the word "application."

First Embodiment

System Configuration

Figure 1:
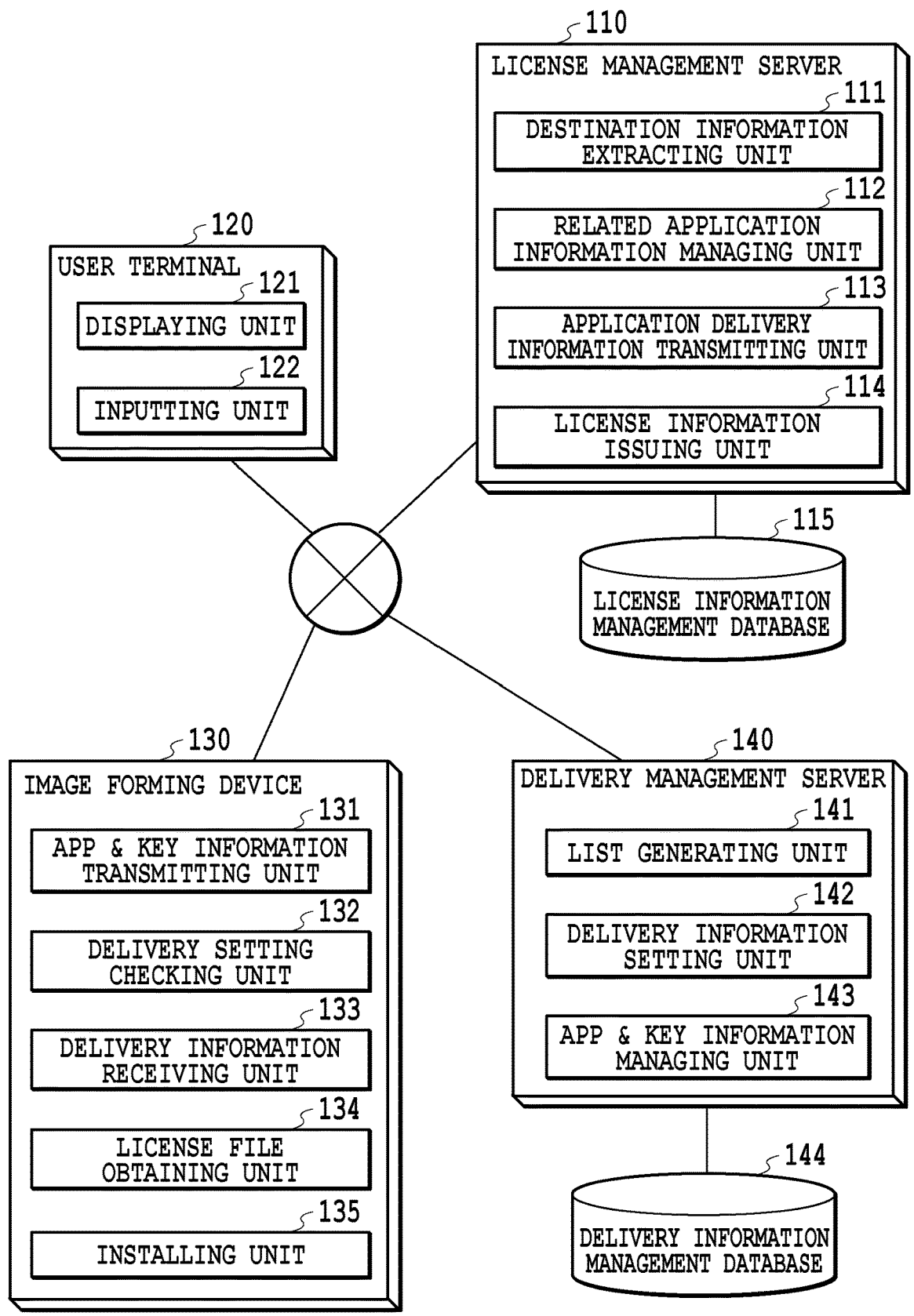
FIG. 1 is a block diagram showing the configuration of a whole system and each unit according to an embodiment.

FIG. 1 is a block diagram showing the whole configuration of an application delivery system according to a first embodiment. The application delivery system of the present embodiment includes a license management server 110, a user terminal 120, an image forming device (apparatus) 130, and a delivery management server 140. They are connected to each other via a network. Further, FIG. 1 also shows functional block diagrams of the servers, the device, and the terminal. In functional blocks shown in FIG. 1, each of CPUs of the servers, the device, and the terminal reads a program stored in a ROM and the like into a RAM, and executes the program, whereby the CPUs function as units shown in FIG. 1.

The license management server 110 includes a destination information extracting unit 111, a related application information managing unit 112, an application delivery information transmitting unit 113, and a license information issuing unit 114. Further, the license management server 110 includes a license information management database 115 for managing destination information, application information, and license information.

The user terminal 120 includes a displaying unit 121 and an inputting unit 122. The user terminal 120 requests the delivery management server 140 to perform processing. Incidentally, explanation has been made on an example in which the user terminal 120 is a separate device, but it is possible to use, as the user terminal, an input device and a display device connected to an interface of the delivery management server 140.

The image forming device 130 capable of installing and executing an application as explained according to the present embodiment includes an app & key information transmitting unit 131, a delivery setting checking unit 132, a delivery information receiving unit 133, a license file obtaining unit 134, and an installing unit 135. Incidentally, in the present embodiment, explanation has been made by citing, as an example, the image forming device such as a multifunction peripheral (MFP) as the device capable of installing and executing an application, but the present invention is not limited to this. Any device can be used as long as the device can install and execute an application, and it is possible to use various information processing devices (apparatuses) such as general computers, smartphones, and tablets.

The delivery management server 140 includes a list generating unit 141, a delivery information setting unit 142, and an app & key information managing unit 143. Further, the delivery management server 140 includes a delivery information management database 144 for managing app & key information and delivery setting information. Incidentally, in the present embodiment, explanation has been made on an example in which the license management server 110 and the delivery management server 140 are separate server devices, but the present invention is not limited to this. More specifically, it is possible to use a server device in which the function of the license management server 110 and the function of the delivery management server 140 are integrated.

<Processing Sequence for a System>

Figure 2:
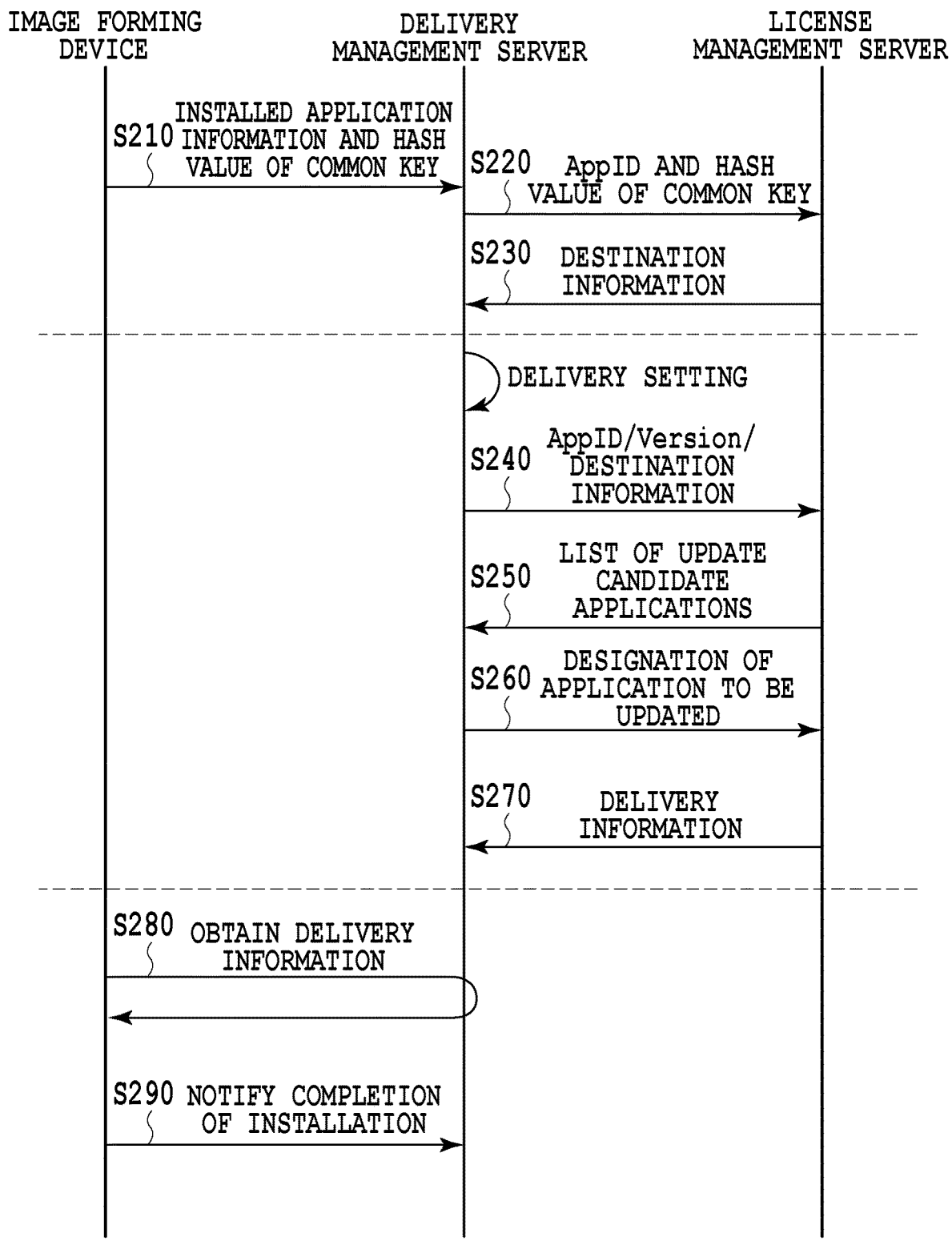
FIG. 2 is a chart showing an entire process sequence according to the embodiment.

FIG. 2 is a chart showing an entire sequence for the application delivery system according to the present embodiment. In step S210, the image forming device transmits, to the delivery management server 140, identification information (ID) for identifying an installed application and the version of the application (hereinafter referred to as application information) as well as the hash value of a common key. This common key is a key for handling an encrypted application.

The delivery management server 140 having received this information stores the received information in association with information for identifying the image forming device having transmitting the information. Managing the information in this manner, the delivery management server 140 can deliver an updated application to the image forming device requiring the updated application. In the present embodiment, in step S230, which has been described later, the delivery management server 140 further associates the information managed by the delivery management server 140 with the destination information. Associating the managed information with the destination information, the delivery management server 140 can specify the image forming device on which the application having a predetermined destination is installed.

In step S220, the delivery management server 140 transmits the ID of the application and the hash value of the common key to the license management server 110. The license management server 110 having received this information extracts the destination information based on the received application ID and the received hash value of the common key.

In step S230, the license management server 110 transmits the extracted destination information to the delivery management server 140 as a response to step S220. The delivery management server 140 stores the received destination information in association with the transmitted application ID and the transmitted hash value of the common key. In this manner, the delivery management server 140 associates and manages the ID and version of the application, the hash value of the common key, the information for identifying the image forming device, and the destination information.

Thereafter, the delivery management server 140 determines the application to be updated and the image forming device 130 according to an instruction from an operating user, and specifies the destination information associated with the application and the image forming device 130. In step S240, the delivery management server 140 transmits the application ID and the destination information to the license management server 110.

In step S250, the license management server 110 transmits, to the delivery management server 140, a list of updatable versions which may vary according to the destination information based on the transmitted application ID and destination information.

In step S260, the delivery management server 140 transmits, to the license management server 110, information indicative of the update version of the application. Then in step S270, the license management server 110 transmits delivery information on the update version of the application to the delivery management server 140.

Then in step S280, the image forming device obtains the delivery information from the delivery management server 140 at any timing. The delivery information includes information indicative of a delivery source of the updated application. Then the image forming device installs the updated application, and in step S290, notifies the delivery management server of the result of installation. In this manner, in the present embodiment, it becomes possible to deliver the updated application only to a certain destination by using the destination information. Detailed explanation will be made below on processing by the image forming device and the server.

<Process Flow for the Image Forming Device>

Next, with reference to FIG. 3, explanation will be made on a process flow for the image forming device 130 according to the first embodiment.

Figure 3:
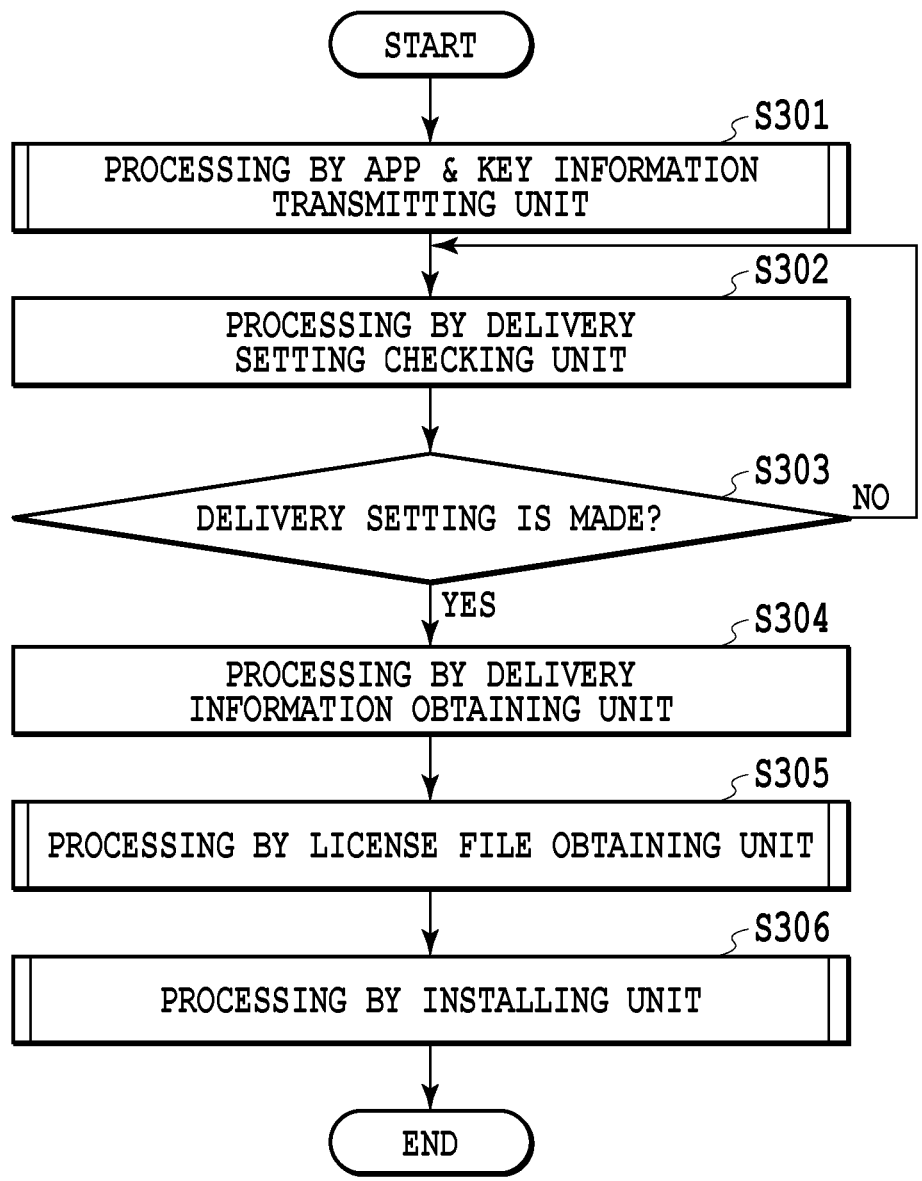
FIG. 3 is a flow chart showing an entire process flow for an image forming device according to the embodiment.

In the image forming device 130 of the present invention, processing shown in FIG. 3 is started at the time of activating the image forming device 130. Incidentally, the processing shown in FIG. 3 is realized by the CPU (not shown) of the image forming device executing a program read from the RAM (not shown) of the image forming device. Note that other process flows in the present application are also realized by the CPU (not shown) of the device or the servers executing a program read from the RAM (not shown) of the device or the servers.

In a case where the image forming device is activated to start the processing, the app & key information transmitting unit 131 starts the processing in step S301. As described later, in the processing in step S301, the processing in S210 of FIG. 2 is performed.

Next, in step S302, the delivery setting checking unit 132 inquires of the delivery management server 140 as to whether the delivery setting of the own image forming device 130 is made. If the result of the delivery setting checking unit 132 inquiring of the delivery management server indicates that no delivery setting is made in step S303, the process returns to step S302, and the processing in step S302 is repeated at certain intervals. If the result of the inquiry indicates that the delivery setting is made in step S303, the delivery information receiving unit 133 receives and obtains delivery information from the delivery management server 140 in step S304. The processing for obtaining the delivery information corresponds to the processing in step S280 of FIG. 2. In step S305, the license file obtaining unit 134 obtains a license file by referring to the delivery information obtained in step S304 as necessary. In step S306, the installing unit installs the application by using the delivery information obtained in step S304 and the license file obtained in step S305. In the installing processing, the delivery management server 140 is notified of the result of the installation. This processing corresponds to the processing in S290 of FIG. 2.

Next, the details of the processing will be explained.

<Process Flow for the App & Key Information Transmitting Unit of the Image Forming Device>

Figure 4:
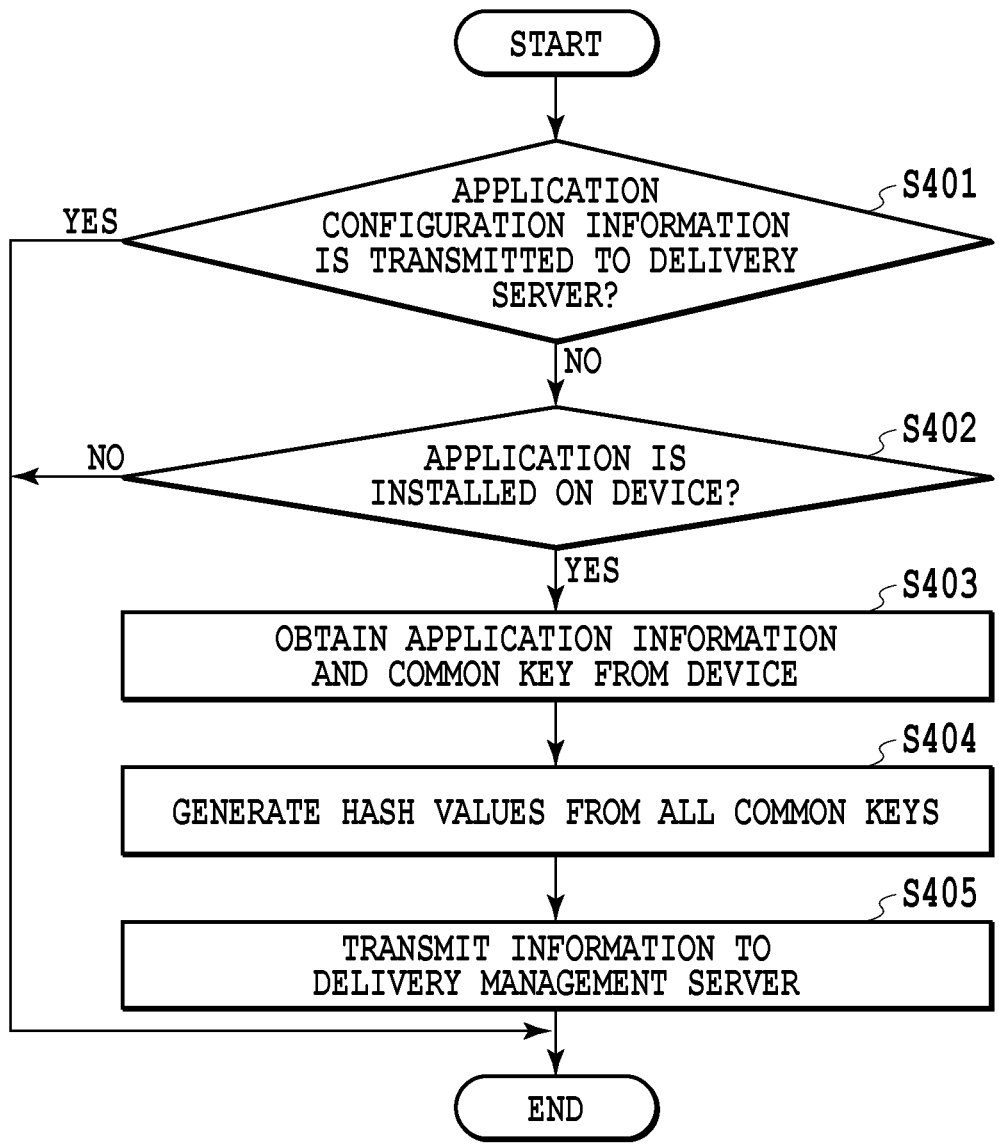
FIG. 4 is a flow chart showing a process flow for an app & key information transmitting unit of the image forming device according to the embodiment.

FIG. 4 shows a process flow of the processing by the app & key information transmitting unit 131 of the image forming device 130 as shown in step S301 of FIG. 3. As stated above, the processing is performed by the app & key information transmitting unit 131 at the time of activating the image forming device 130. Incidentally, the processing does not need to be started at the time of activating the image forming device 130, and the processing may be performed periodically or non-periodically after the image forming device 130 is activated.

In step S401, the app & key information transmitting unit 131 determines whether the delivery management server 140 has transmitted application configuration information to the delivery management server 140. The application configuration information includes, for example, application identification information (ID) for identifying the application installed on the image forming device 130, information indicative of the version of the application, and the hash value of the common key for the application. In a case where a plurality of applications are installed, information on the respective applications is collectively referred to as application configuration information. If the application configuration information has already been transmitted, the process ends. If the application configuration information has not been transmitted, the process proceeds to step S402.

In step S402, the app & key information transmitting unit 131 determines whether the application is installed on the own image forming device 130. If no application is installed, the process ends.

If the application is installed, in step S403, the app & key information transmitting unit 131 obtains information (hereinafter referred to as application information) indicative of the ID and version of the application managed in the own image forming device 130 and the corresponding common key. In the image forming device 130, the app & key information transmitting unit 131 manages information as shown in Table 1 as information on the installed application.

In Table 1, AppID is an identifier for uniquely identifying the application in the image forming device 130, Version is the version of the application, and Common Key is information on the common key used to encrypt the application. The image forming device 130 decrypts the encrypted application by using the managed common key and executes the application. In the present embodiment, the processing is performed by using information on the managed application without using information included in the application.

TABLE 1

| AppID | Version | Common Key |
|---|---|---|
| ABC1234 | V1.0 | dgkljalkrjtga;lkha;lkha;lkfha |
| CDE5678 | V2.0 | oeplda;ldpfleiejsjglskiaepo |

Next, in step S404, the app & key information transmitting unit 131 generates each hash value from the common key each obtained in step S403. Next, in step S405, the app & key information transmitting unit 131 transmits, to the delivery management server 140, the hash values of the common keys generated in step S404 and the corresponding application information, and the process ends. The image forming device 130 transmits information as shown in Table 2, for example to the delivery management server 140. Incidentally, DS# is device identification information for uniquely identifying the image forming device 130 which transmits the information. As shown in Table 2, the app & key information transmitting unit 131 transmits the application configuration information and the information for uniquely specifying the image forming device to the delivery management server 140. Incidentally, in a case where the delivery management server 140 can identify the image forming device based on information used at the time of transmission such as the IP address of the transmission source, the information (ID) for identifying the image forming device may not be transmitted to the delivery management server 140 as the information. In step S405, transmission of the information corresponds to S210 in FIG. 2.

TABLE 2

| AppID | Version | Hash Value of CommonKey | DS# |
|-------|---------|-------------------------|------|
| ABC1234 | v1.0 | tertyrturjhjssrtrytu | AAA00501 |
| CDE5678 | v2.0 | hlkjsdtoiuetkjglskgj | AAA00501 |

<Process Flow for the License File Obtaining Unit of the Image Forming Device>

Figure 5:
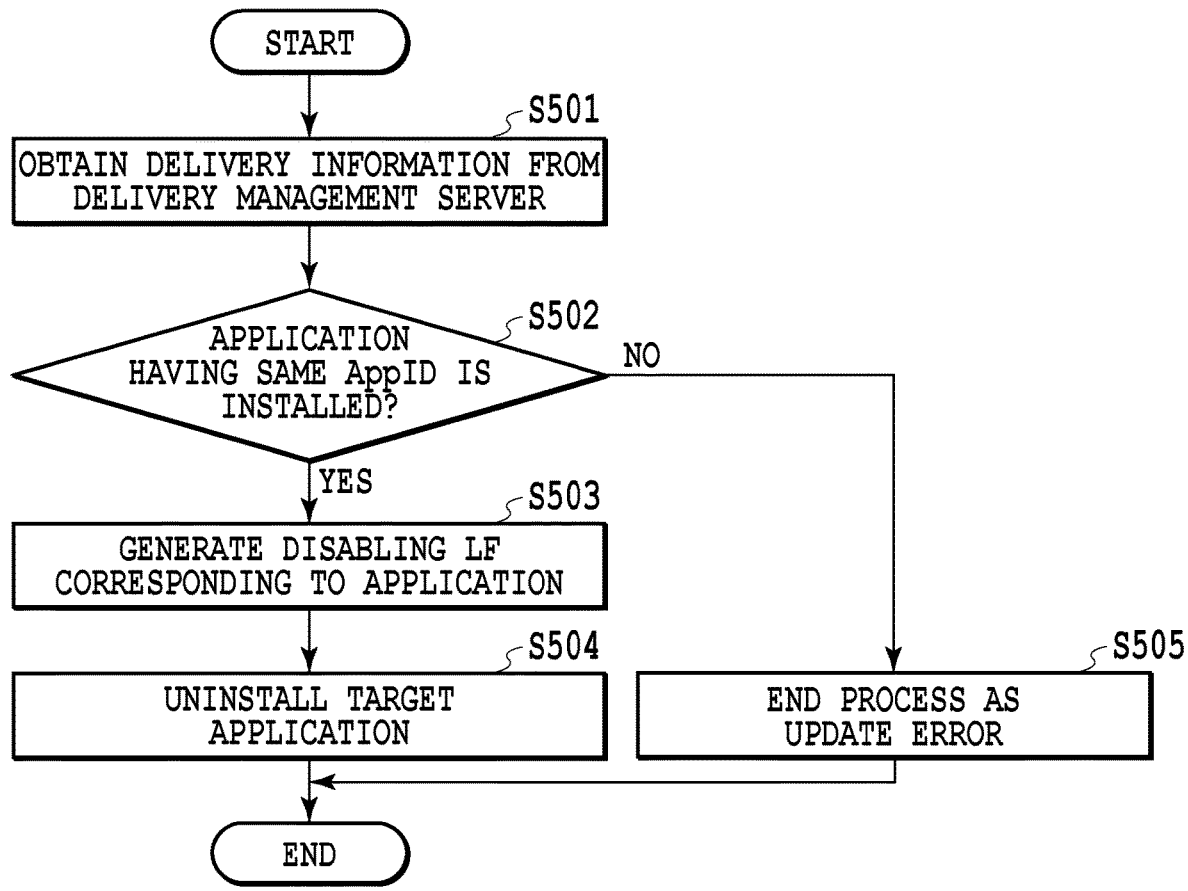
FIG. 5 is a flow chart showing a process flow for a license file obtaining unit 134 of the image forming device according to the first embodiment.

FIG. 5 is a flow chart showing a process flow for the license file obtaining unit 134 of the image forming device 130. As explained with respect to the process flow of FIG. 3, in a case where the delivery information receiving unit 133 completes the processing for obtaining the delivery information, the license file obtaining unit 134 starts to perform the processing. The delivery information includes application information for identifying the delivered application and information indicative of the delivery source of the application. Table 3 shows examples of the delivery information received by the delivery information receiving unit 133 from the delivery management server 140. The license file obtaining unit can obtain an application name as well as the AppID/Version as the application information. Further, the license file obtaining unit can obtain a URI for downloading the application as information indicative of the delivery source of the application. Incidentally, a delivery server indicated by the URI which indicates the delivery source of the application does not need to be the delivery management server 140.

TABLE 3

| Application Name | AppID | Version | URI |
|---|---|---|---|
| Hello | ABC1234 | V1.0 | http://www.xxxx.co.jp/1234 |
| Sample | CDE5678 | V2.0 | http://www.xxxx.co.jp/5678 |

In step S501, the license file obtaining unit 134 obtains the delivery information received by the delivery information receiving unit 133 from the delivery management server 140. In step S502, the license file obtaining unit 134 determines whether an application identical to the one specified by the AppID included in the obtained delivery information is installed on the own image forming device 130. If it is determined that the application is installed, the process proceeds to step S503, and the license file obtaining unit 134 generates a disabling license file for the corresponding application. The disabling license file is a license file which is generated in a case where an installed license file is uninstalled. The disabling license file includes a common key for decrypting an encrypted application, and can be used to decrypt a different version of an application managed by the license management server 110. Next, in step S504, the license file obtaining unit 134 uninstalls an application corresponding to the disabling license file generated in step S503. In the meantime, if it is determined in step S502 that the corresponding application is not installed, the license file obtaining unit 134 ends the process as an update error in step S505.

<Process Flow for the Installing Unit of the Image Forming Device>

Figure 6:
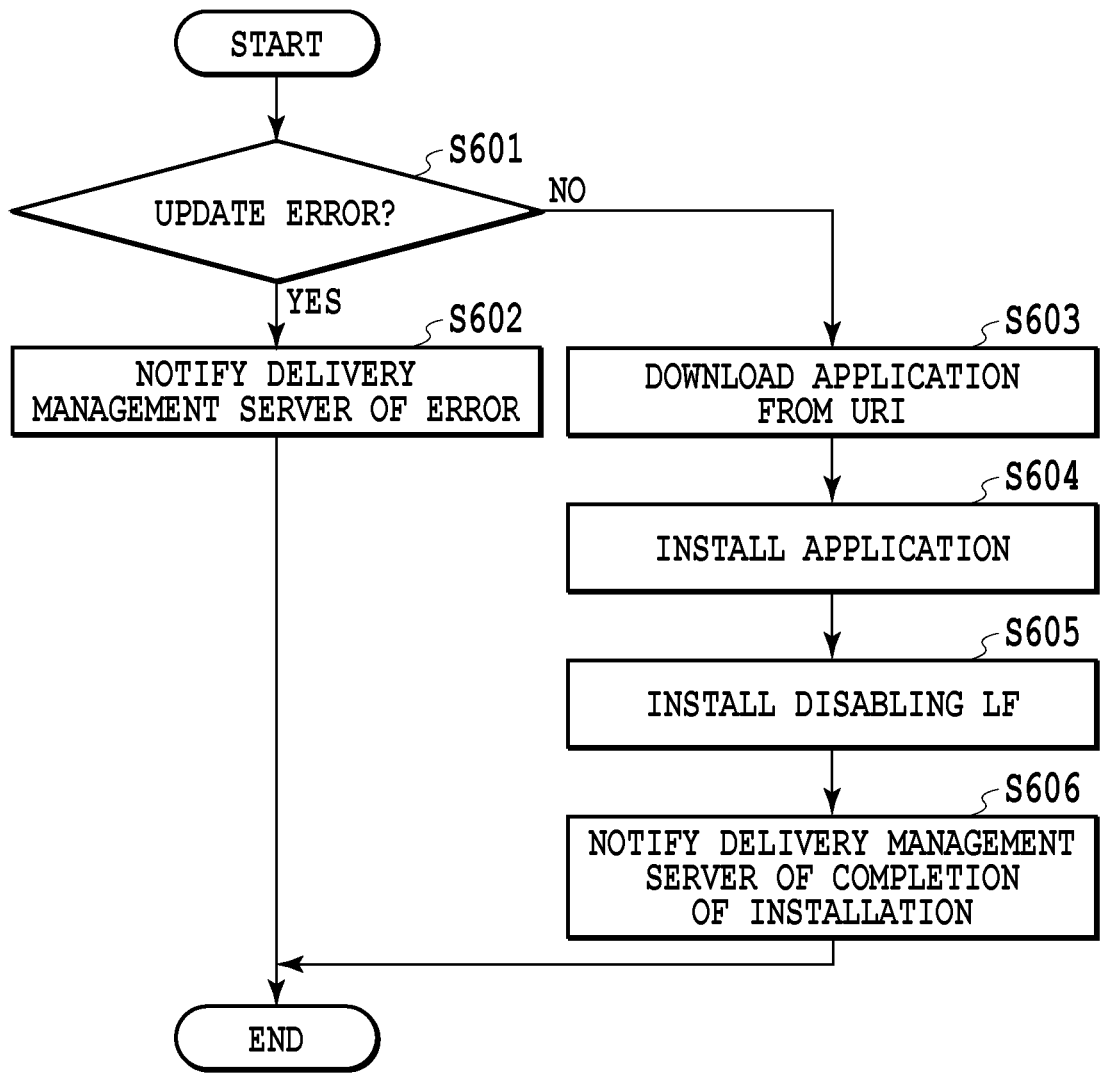
FIG. 6 is a flow chart showing a process flow for an installing unit of the image forming unit according to the first embodiment.

FIG. 6 shows a process flow for the installing unit 135 of the image forming device 130. As shown in FIG. 3, in a case where the processing by the license file obtaining unit 134 ends, the processing by the installing unit 135 starts.

In step S601, the installing unit 135 determines whether or not the result of the processing by the license file obtaining unit 134 is an update error. If the result is an update error, in step S602, the installing unit 135 notifies the delivery management server 140 of the error and ends the process.

Meanwhile, if the result is not an update error, in step S603, the installing unit 135 downloads the corresponding application from the URI included in the delivery information received by the delivery information receiving unit 133. Then in step S604, the installing unit 135 installs the application downloaded in step S603. Next, in step S605, the installing unit 135 installs the disabling license file generated by the license file obtaining unit 134. In step S606, the installing unit 135 notifies the delivery management server 140 of completion of installation, and ends the process. This processing corresponds to the processing in S290 of FIG. 2.

The above is an explanation of the process flow for the image forming device. Next, explanation will be made below on a process flow for the delivery management server.

<Process Flow for the App & Key Information Managing Unit of the Delivery Management Server>

Figure 7:
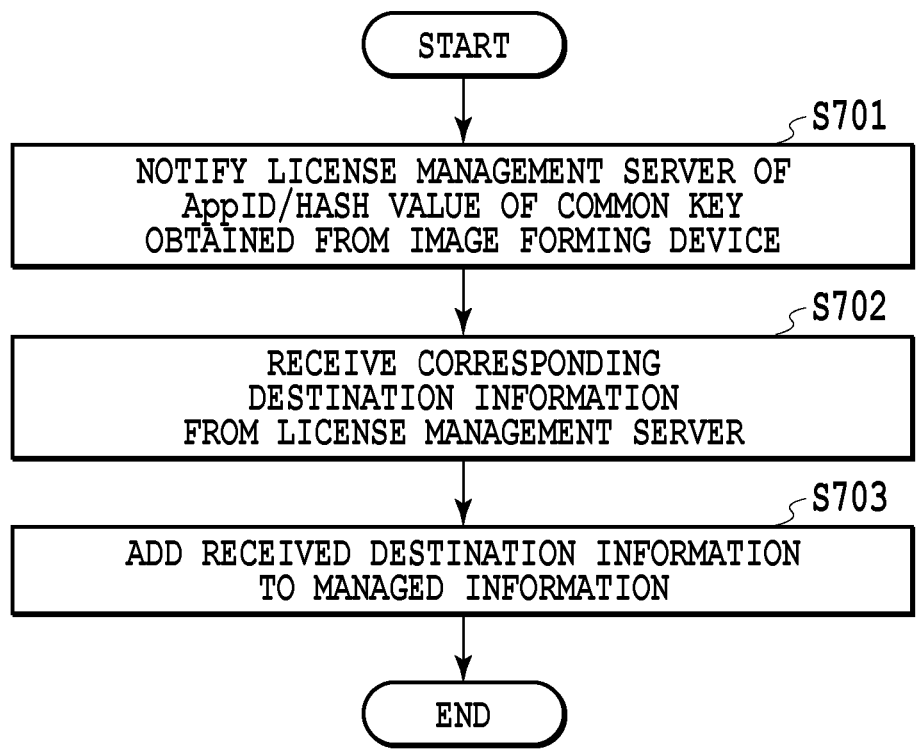
FIG. 7 is a flow chart showing a process flow for an app & key information managing unit 143 of a delivery management server according to the embodiment.

FIG. 7 shows a process flow for the app & key information managing unit 143 of the delivery management server 140. Processing shown in FIG. 7 is started after the app & key information managing unit 143 obtains the configuration information on the application transmitted from the app & key information transmitting unit 131 of the image forming device 130.

In step S701, the app & key information managing unit 143 notifies the license management server 110 of the AppID and the hash value of the common key which are received from the app & key information transmitting unit 131 of the image forming device 130. This processing corresponds to the processing in S220 in response to S210 of FIG. 2. In step S702, the app & key information managing unit 143 obtains the destination information transmitted from the license management server 110 in response to the notification in step S701. In step S703, the app & key information managing unit 143 adds the destination information received in step S702 to information managed by the app & key information managing unit 143 of the delivery management server 140, and ends the process. Incidentally, explanation will be made later on processing in which the license management server 110 specifies the destination information based on the application information and the hash value of the common key.

Table 4 illustrates information managed by the app & key information managing unit 143. The app & key information managing unit 143 manages the destination information for each application received from the license management server 110 in addition to the information transmitted from the app & key information transmitting unit 131 of the image forming device 130.

TABLE 4

| AppID | Version | Hash Value of Common Key | DS# | Destination Information |
|---|---|---|---|---|
| ABC1234 | V1.0 | tertyrturjhjssrtrytu | AAA00501 | JP |
| CDE5678 | V2.0 | tertyrturjhjssrtrytu | AAA00501 | JP |

<Entire Process Flow for Delivery Setting of the Delivery Management Server>

Next, with reference to FIG. 8, explanation will be made below on an entire process flow for delivery setting of the delivery management server 140. In processing shown in FIG. 8, the delivery information is transmitted from the license management server 110 to the delivery management server 140 as shown in S270 of FIG. 2, and the delivery management server 140 manages the delivery information. The processing shown in FIG. 8 is based on the premise that the app & key information managing unit 143 of the delivery management server 140 manages information associated with the destination information as stated above.

Figure 8:
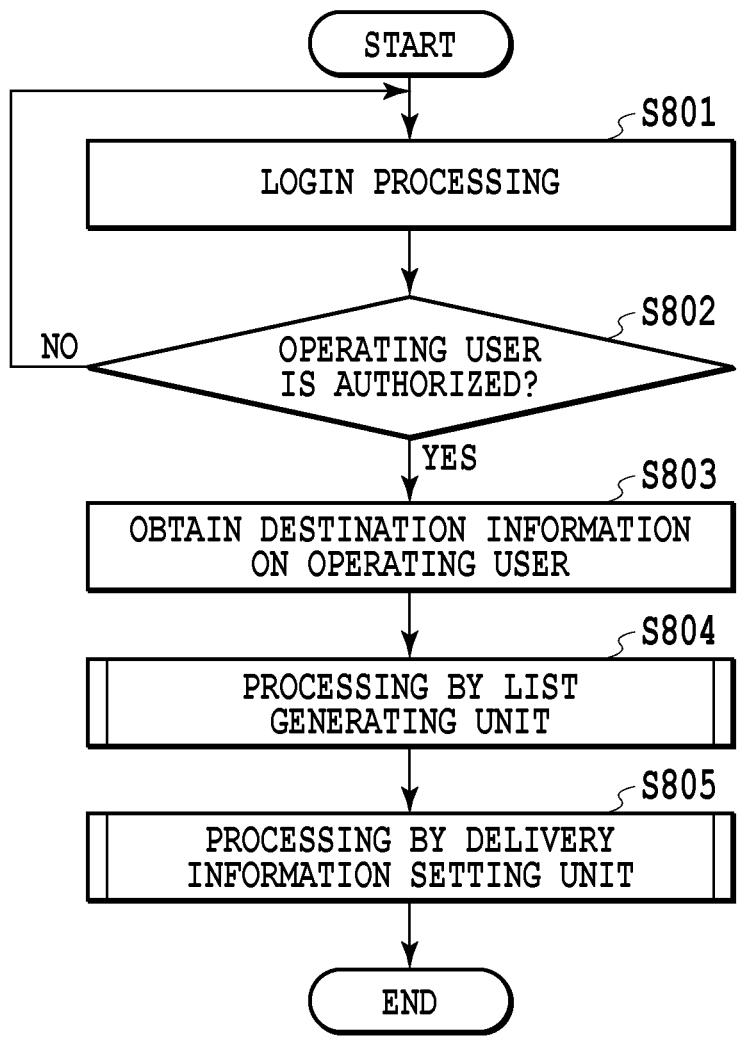
FIG. 8 is a flow chart showing an entire process flow for making delivery setting of the delivery management server according to the embodiment.

The processing shown in FIG. 8 is started in response to processing by the user terminal 120. In a case where the user terminal requests processing for delivery setting, the delivery management server 140 requests login processing in step S801. For example, the delivery management server 140 causes the user terminal 120 to display a login screen for specifying an operating user. Then in step S802, the delivery management server 140 determines whether or not the operating user is authorized based on information input from the user terminal. If it is determined that the operating user is not authorized, the processing in step S801 is repeated. If it is determined that the operating user is authorized, in step S803, the delivery management server 140 obtains the destination information on the operating user by referring to user information managed by using the delivery information management database 144. In step S804, the delivery management server 140 causes the list generating unit 141 to start processing, and then in step S805, the delivery management server 140 causes the delivery information setting unit 142 to start processing.

Table 5 shows examples of the user information managed by using the delivery information management database 144 of the delivery management server 140. The delivery information management database 144 is used to manage the destination information on the operating user as well as an ID/password for checking whether or not the operating user is right.

TABLE 5

| LoginID | Password | Destination |
|---|---|---|
| XYZ001 | ******* | JP |
| XYZ002 | ******* | JP |
| XYZ003 | ******* | EN |

Figure 9:
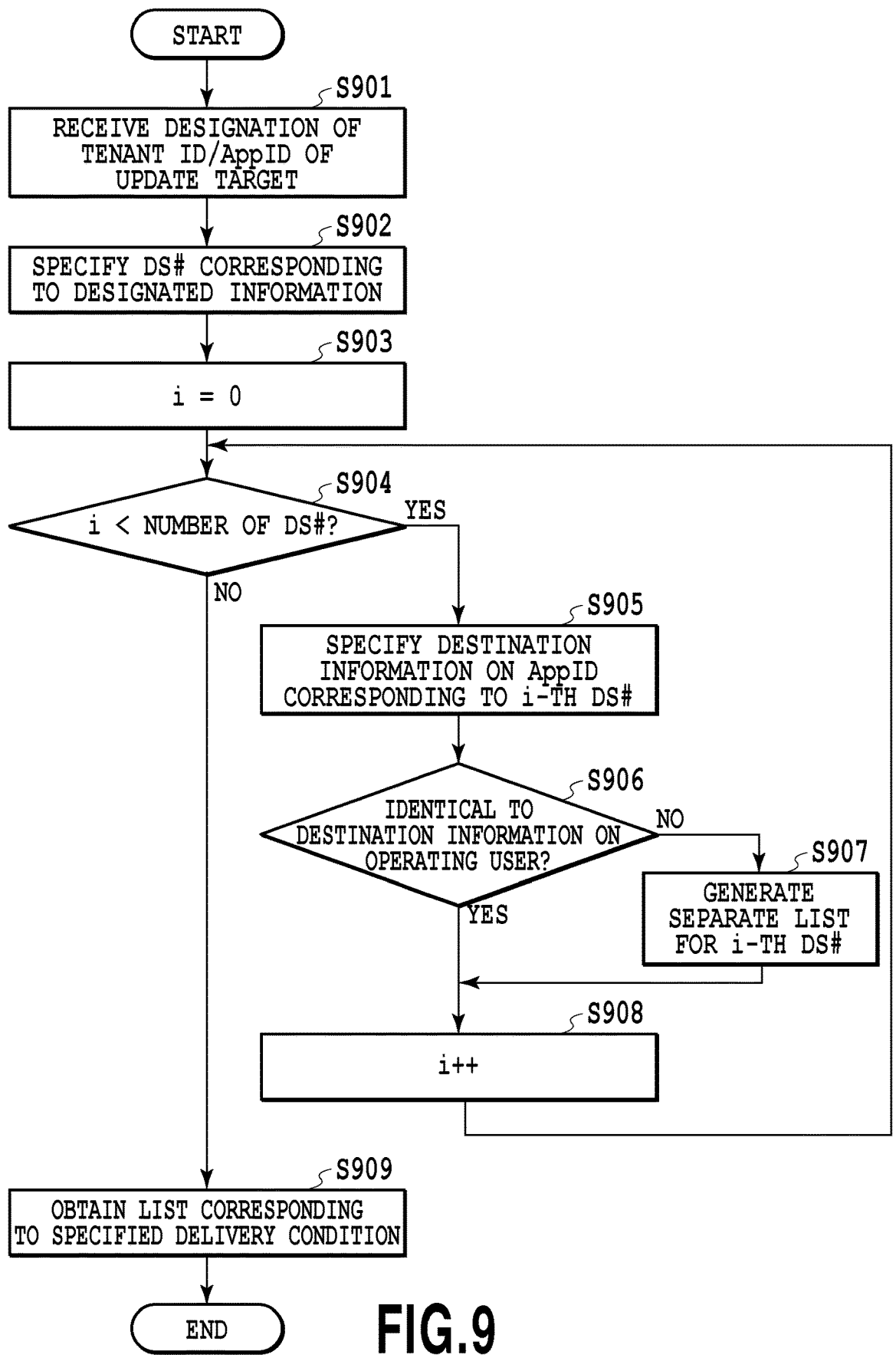
FIG. 9 is a flow chart showing a process flow for a list generating unit of the delivery management server according to the embodiment.

FIG. 9 shows a process flow for the list generating unit 141 of the delivery management server 140. In a case where it is determined via the login screen that the operating user is authorized, the list generating unit 141 starts processing shown in FIG. 9.

In step S901, the list generating unit 141 receives, from the operating user who has logged in, the designation of a tenant ID and information (an application ID) for specifying an application to be updated. A tenant is a client to whom the operating user provides the application. In a case where setting is made so that the application to be updated is delivered to a specific client, the operating user can designate the tenant by using the tenant ID. In the present embodiment, the tenant ID is associated with the image forming device, and the image forming device to be updated can be specified by designating the tenant ID. In step S902, the list generating unit 141 specifies the image forming device 130 corresponding to the information designated in step S901. More specifically, the image forming device which is subject to updating processing is specified.

Next, in step S903, a variable i is initialized with 0. Processing in subsequent steps S904 to S908 is repeated the number of times which is equal to the number of the image forming devices specified in step S902. In step S904, the list generating unit 141 determines whether the variable i is smaller than the number of the image forming devices specified in step S902. In a case where the variable i is smaller than the number of the image forming devices specified in step S902, the process proceeds to step S905. In step S905, the list generating unit 141 specifies the destination information on the application corresponding to the i-th image forming device by using the app & key information managing unit 143. As explained above with respect to Table 4, the app & key information managing unit 143 associates and manages the ID and version of the application, the hash value of the common key, the identification information of the image forming device, and the destination information. Accordingly, it is possible to specify the destination information on the application corresponding to the i-th image forming device based on the application ID whose designation is received in step S901 and the identification information of the i-th image forming device.

Next, in step S906, the list generating unit 141 determines whether the destination information on the i-th image forming device as specified in step S905 is identical to the destination information on the operating user obtained in step S803 of FIG. 8. If the destination information on the i-th image forming device as specified in step S905 is different from the destination information on the operating user obtained in step S803 of FIG. 8, the process proceeds to step S907, and since it is determined that the i-th image forming device is an image forming device having different destination information, a separate list is generated and managed. Table 6 is a separate list for managing the image forming device having the destination information different from the main destination information. The following separate list is generated by the list generating unit 141 based on the information managed by the app & key information managing unit 143 of the delivery management server 140 in step S907.

TABLE 6

| AppID | Version | DS# | Destination Information |
|---|---|---|---|
| ABC1234 | V1.0 | AAA00502 | EN |

In step S906, if it is determined that the destination information on the i-th image forming device is identical to the destination information on the operating user, the process proceeds to step S908 without going through step S907. In step S908, the list generating unit 141 increments the variable i, and the process proceeds to step S904.

Then in step S904, if it is determined that the variable i is not smaller than the number of the image forming devices specified in step S902, the list generating unit 141 obtains a list corresponding to a delivery condition specified by the operating user in step S909.

<Example of a User Interface Screen in the Delivery Management Server>

FIGS. 10A and 10B are views showing examples of a screen which is displayed by the processing of the list generating unit 141 of the delivery management server 140. A search screen 1001 includes a text box 1002 for inputting a tenant ID, a radio button 1003 for designating the setting type of an object to be delivered, and a check box 1004 for designating a delivery condition based on a search condition. Further, the search screen 1001 includes a text box 1005 for specifying an application, a Search button 1006 for executing search, and a Cancel button 1007 for cancelling search. In a case where the operating user who has logged in selects application delivery as a setting type, sets the condition, and executes the Search button 1006, the processing shown in FIG. 9 is started. The image forming devices managed by using the tenant IDs are searched for the image forming device on which the designated application is installed, and a list of the image forming devices matching the designated delivery condition is obtained. Incidentally, FIGS. 9, 10A, and 10B show examples of using only the text box 1005 for designating the AppID as information that specifies the application, but it is also possible to designate information that specifies the version.

FIG. 10B shows an example of displaying the list obtained in step S909 after executing the Search button 1006 in FIG. 10A and performing the processing by the list generating unit 141. More specifically, FIG. 10B shows a search result screen of the target image forming device corresponding to the predetermined tenant ID and application ID.

A search result screen 1051 displays information 1052 for uniquely specifying the image forming device, information 1053 indicative of the version of the application, and destination information 1054. The search result screen 1051 displays, as the list, information for the number of the image forming devices specified as a result of search (1055-1057). Further, the search result screen 1051 includes a delivery setting button 1058 for selecting the image forming device 130 which is subject to the delivery setting and executing the delivery setting and a Cancel button 1059 for cancelling the delivery setting.

In the example of FIG. 10B, it is shown that the destination of the applications installed on the image forming devices in the lists 1055 and 1056 is identical to that of the operating user. Further, it is shown that the application installed on the image forming device in the list 1057 is different from the destination of the operating user. A state in which the application cannot be selected at the time of the delivery setting is shown. Incidentally, there is also a method in which in a case where the application whose destination is different from that of the operating user is installed, the image forming device itself is not displayed. It is possible to distinguishingly display or not display the list whose destination is different from that of the operating user as shown in FIG. 10B by referring to the list generated as the separate list in step S907 of FIG. 9.

Figure 11A:
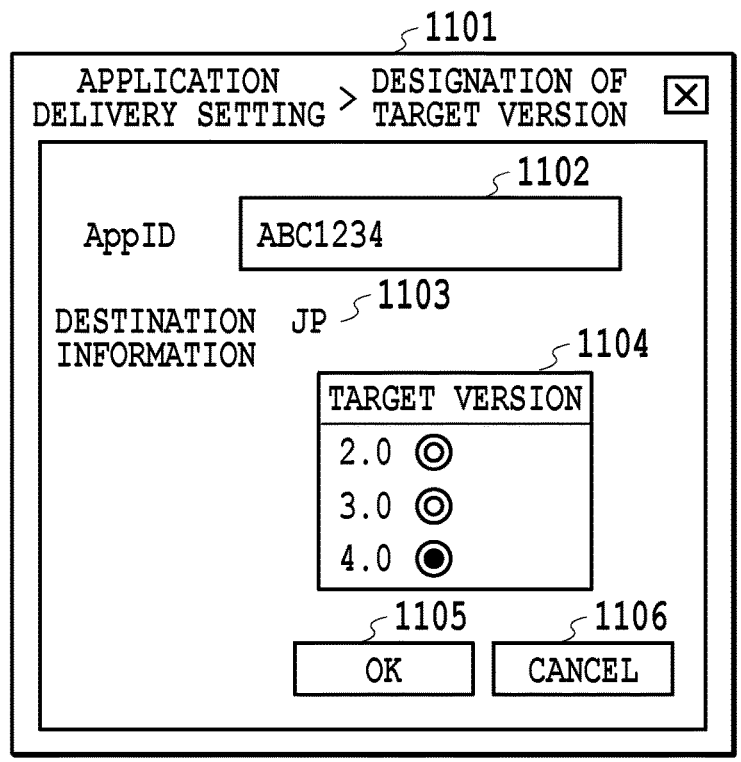
FIGS. 11A and 11B are views showing an application designation screen displayed by the delivery management server according to the embodiment.
Figure 11B:
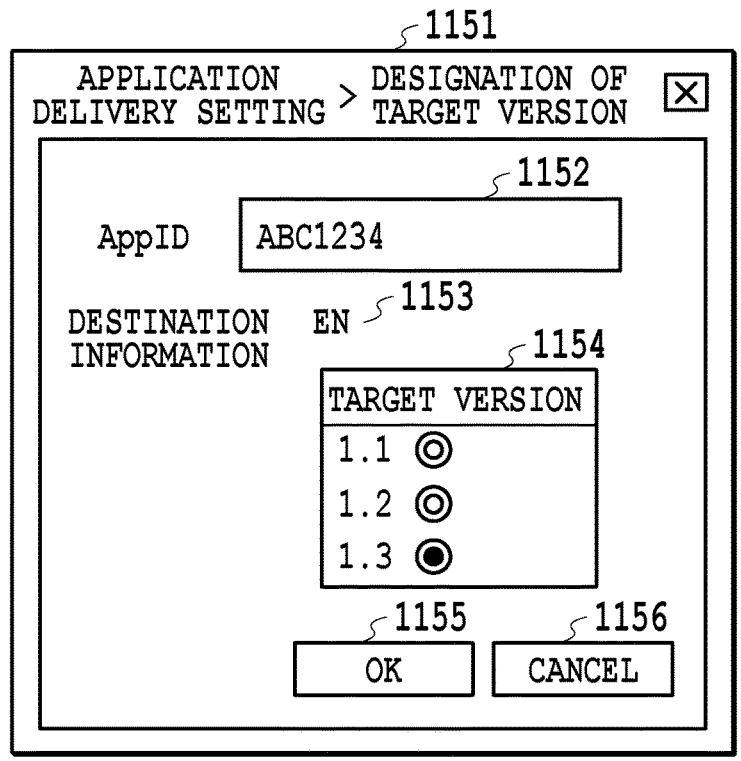

Next, in a case where the operating user presses the delivery setting button 1058 in FIG. 10B, the delivery information setting unit 142 performs the processing. FIGS. 11A and 11B show application version designation screens displayed by the delivery information setting unit 142 of the delivery management server 140.

FIGS. 11A and 11B show an application version designation screen 1101/1151 in which there are displayed a label 1102/1152 for displaying the AppID which specifies the application and a label 1103/1153 for displaying the destination information on the target application. Further, there is displayed a list box 1104/1154 for selecting the update version. Further, there are displayed an OK button 1105/1155 for specifying the version of the application and a Cancel button 1106/1156 for cancelling the designation of the version of the application. FIG. 11A shows an example in which the destination information is "JP," and FIG. 11B shows an example in which the destination information is "EN." Further, FIGS. 11A and 11B show that updatable versions vary depending on the destination information. Incidentally, the list box 1104/1154 for selecting the update version in FIGS. 11A and 11B is displayed based on the information managed by the license management server 110. The information managed by the license management server 110 will be described later.

According to the operating user's instruction given via the screen shown in FIGS. 11A and 11B, the delivery information setting unit 142 can obtain desired related-application information based on the AppID and the destination information. FIGS. 11A and 11B show that it is possible to obtain information indicative of which version of the application is to be delivered to which destination.

FIG. 12 shows a delivery setting registration screen 1201 for the delivery information setting unit 142 of the delivery management server 140. FIG. 12 shows an example of a screen displayed in a case where the destination information is "JP" as shown in FIG. 11A, the predetermined version is selected, and the OK button 1105 is pressed. In the delivery setting registration screen 1201, there are displayed information 1202 that specifies the image forming device 130, an item 1203 for setting a delivery date, and an item 1204 for setting a delivery time. The above information and items are displayed as much as number of the image forming devices designated by the operating user in the search result screen of the image forming device of FIG. 10B (1205-1206). Further, the delivery setting registration screen 1201 includes a delivery registration button 1207 for performing delivery registration after inputting necessary matters and a Cancel button 1208 for cancelling delivery registration. Incidentally, while FIG. 12 shows an example of individually designating a delivery date and time for each image forming device 130, it is possible to collectively designate a delivery date and time for all the image forming devices 130.

<Process Flow for the Delivery Information Setting Unit of the Delivery Management Server>

Figure 13:
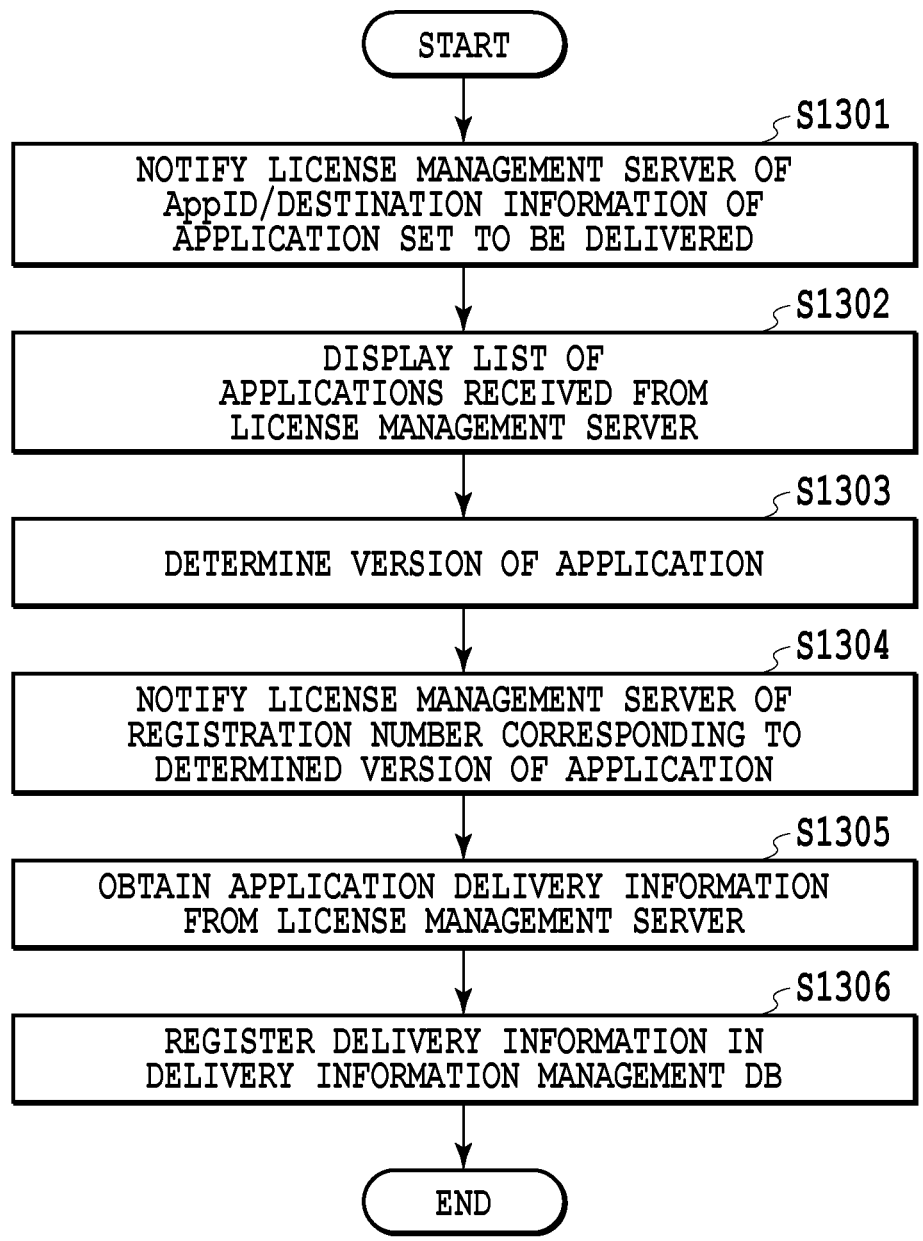
FIG. 13 is a flow chart showing an entire process flow for a delivery information setting unit of the delivery management server according to the first embodiment.

FIG. 13 shows an entire process flow for the delivery information setting unit 142 of the delivery management server 140. In a case where the operating user executes the delivery setting button 1058 in the search result screen 1051 in which the list of the search result of the image forming devices is displayed as shown in FIG. 10B, processing in FIG. 13 is started.

In step S1301, the delivery information setting unit 142 firstly notifies the license management server 110 of the AppID, version, and destination information of the application which is set to be delivered. More specifically, the delivery information setting unit 142 notifies the license management server 110 of the application ID designated by the operating user in the screen shown in FIG. 10A before the operation in FIG. 10B and the version and destination information (that is, the destination information corresponding to the operating user) displayed in the search result screen shown in FIG. 10B. This processing corresponds to the processing in S240 of FIG. 2.

In response to this notification, the license management server 110 transmits a list of updatable applications to the delivery management server 140. This processing corresponds to the processing in S250 of FIG. 2.

In step S1302, the delivery information setting unit 142 displays the list of applications received from the license management server 110 in the application version designation screen shown in FIGS. 11A and 11B, for example. More specifically, in FIGS. 11A and 11B, for example, the delivery information setting unit 142 displays the list of applications in the list box 1104/1154 for selecting the update version.

In step S1303, the delivery information setting unit 142 determines the update version of the application according to the operating user's instruction. In step S1304, the delivery information setting unit 142 notifies the license management server 110 of a registration number corresponding to the version of the application determined in step S1303. The registration number is information for uniquely specifying the application on the license management server 110, and is included in the list of applications obtained from the license management server 110 in step S1302. Table 7 shows information on the list of applications received from the license management server 110 in a case where in step S1301, it is specified that the AppID is "ABC1234" and that the destination information is "JP."

TABLE 7

| AppID | Version | Registration Number |
|---|---|---|
| ABC1234 | V2.0 | 1001 |
| ABC1234 | V3.0 | 1002 |
| ABC1234 | V4.0 | 1004 |

Table 7 corresponds to matters displayed in the list box 1104 for selecting the update version in FIG. 11A.

In step S1304, in response to notifying the license management server 110 of the registration number, the application delivery information transmitting unit 113 of the license management server 110 transmits delivery information for downloading the application to the delivery management server 140. This processing corresponds to the processing in step S270 of FIG. 2.

In step S1305, the delivery information setting unit 142 obtains the application delivery information from the license management server 110. Then in step S1306, the delivery information setting unit 142 registers the delivery information obtained in step S1305 in the delivery information management database 144, and the process ends. Table 8 shows examples of the delivery information managed by the delivery information management database 144.

TABLE 8

| DS# | Application Name | AppID | Version | URI | Delivery Date and Time |
|---|---|---|---|---|---|
| AAA00501 | Hello | ABC1234 | V2.0 | http://www.xxxx.co.jp/1234 | Oct. 20, 2014 |
| AAA00502 | Hello | ABC1234 | V2.0 | http://www.xxxx.co.jp/1234 | Oct. 20, 2014 |

Table 8 shows a state in which the version determined in step S1303, the delivery information (URI) obtained in step S1306, a delivery date and time the designated by the operating user through the screen displayed in FIG. 12 are associated and managed for each image forming device.

Incidentally, it is possible to obtain the application name from information associated with the application ID. Further, the version in Table 8 is on a basis of not only the determination in step S1303 but also information included in the delivery information.

<Process Flow for the License Management Server>

Next, explanation will be made on the process flow for the license management server 110. Firstly, explanation will be made on processing by the destination information extracting unit 111 of the license management server 110. As stated above, the destination information extracting unit 111 extracts the destination information based on the application ID and the hash value of the common key transmitted from the delivery management server 140, and transmits the extracted destination information to the delivery management server 140.

<Process Flow for the Destination Information Extracting Unit of the License Management Server>

Figure 14:
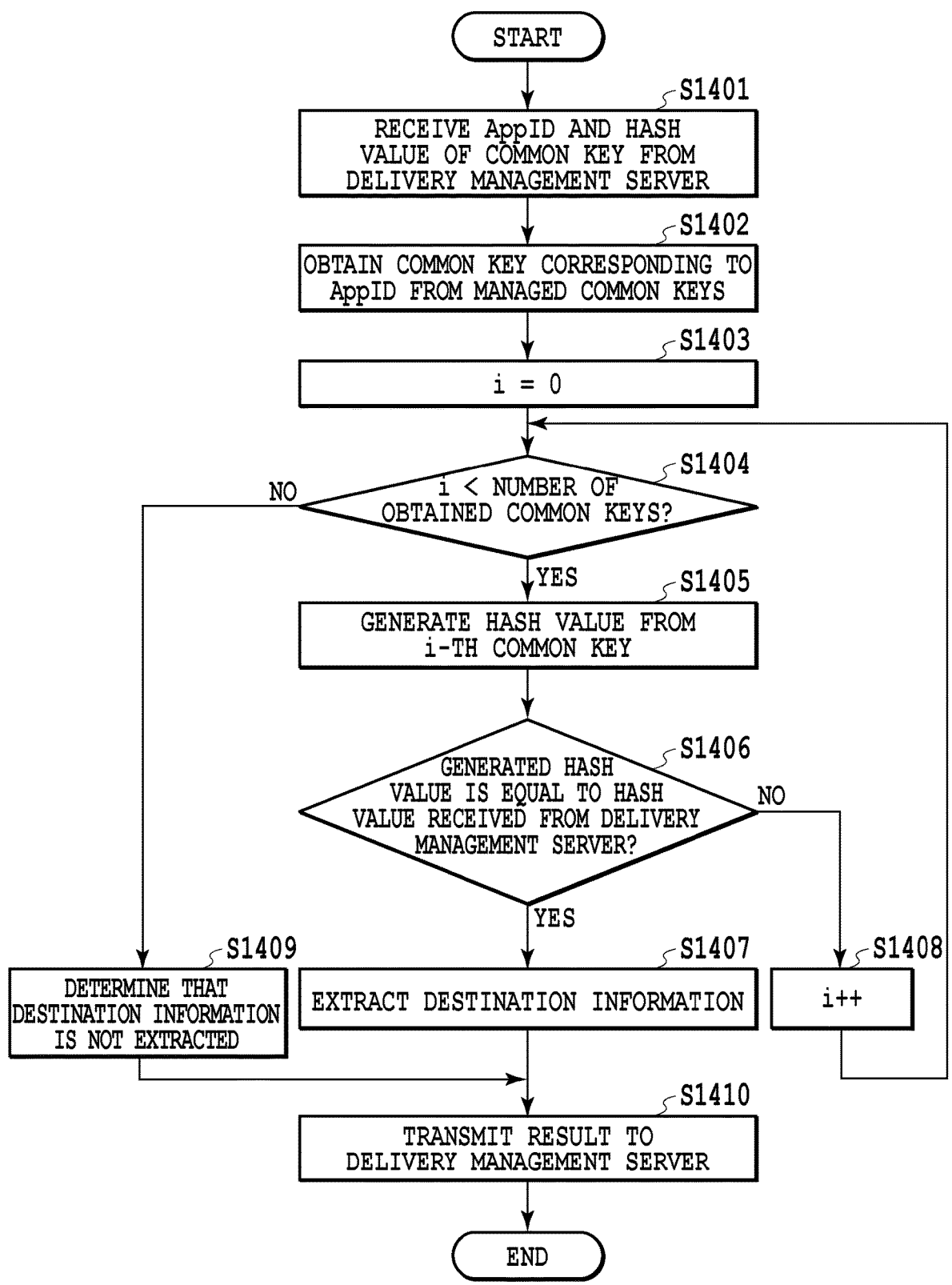
FIG. 14 is a flow chart showing a process flow for a destination information extracting unit of the license management server according to the embodiment.

FIG. 14 shows a process flow for the destination information extracting unit 111 of the license management server 110. In step S1401, the destination information extracting unit 111 receives the AppID and the hash value of the common key from the app & key information managing unit 143 of the delivery management server 140. This processing corresponds to the processing in step S220 of FIG. 2.

Next, in step S1402, the destination information extracting unit 111 obtains a common key corresponding to the AppID received in step S1401 out of common keys managed by the license management server 110. Next, in step S1403, a variable i is initialized with zero.

In next step S1404, the destination information extracting unit 111 determines whether the variable i is smaller than the number of the common keys obtained in step S1402. If the variable i is smaller than the number of the common keys obtained in step S1402, the process proceeds to step S1405, and if the variable i is not smaller than the number of the common keys obtained in step S1402, the process proceeds to step S1409.

In step S1405, the destination information extracting unit 111 generates the hash value of the i-th common key. Then, in step S1406, the destination information extracting unit 111 determines whether the hash value of the common key generated in step S1405 is equal to the hash value of the common key received in step S1401. In a case where these hash values are equal to each other, the process proceeds to step S1407. In step S1407, the destination information extracting unit 111 extracts the destination information associated with the i-th common key as the destination information corresponding to the AppID and the hash value of the common key received in step S1401, and the process proceeds to step S1410. In the meantime, in a case where the above hash values are not equal to each other, in step S1408, the destination information extracting unit 111 increments the variable i, and the process proceeds to step S1404. In a case where none of the hash values of all the common keys managed by the license management server 110 is equal to the hash value of the common key received in step S1401, it is determined that the destination information is not extracted, and the process proceeds to step S1410.

In step S1410, the destination information extracting unit 111 transmits the result obtained in step S1407 or step S1409 to the delivery management server 140. More specifically, in a case where the destination information can be extracted in step S1407, the destination information extracting unit 111 transmits, to the delivery management server 140, the destination information corresponding to the AppID and the hash value of the common key transmitted from the delivery management server 140. This processing corresponds to the processing in S230 of FIG. 2.

Table 9 shows examples of combinations of the hash value of the common key and the destination information managed by the license management server 110.

TABLE 9

| AppID | Destination Information | Hash Value of Common Key |
|---|---|---|
| ABC1234 | JP | tertyrturjhjssrtrytu |
| CDE5678 | EN | hlkjsdtoiuetkjglskgj |

The license management server 110 manages the common keys uniquely identified in combination with the AppID and the destination information. Accordingly, it is possible to specify the destination information corresponding to the hash value of the common key and the AppID received from the delivery management server 140 by using a combination of the hash value of the common key and the AppID.

Next, explanation will be made on the processing by the related application information managing unit 112 of the license management server 110. The related application information managing unit 112 receives the AppID, version, and destination information transmitted from the delivery management server 140 as stated above, and transmits a version-upgrade list of updatable applications to the delivery management server 140.

<Process Flow for the Related Application Information Managing Unit of the License Management Server>

Figure 15:
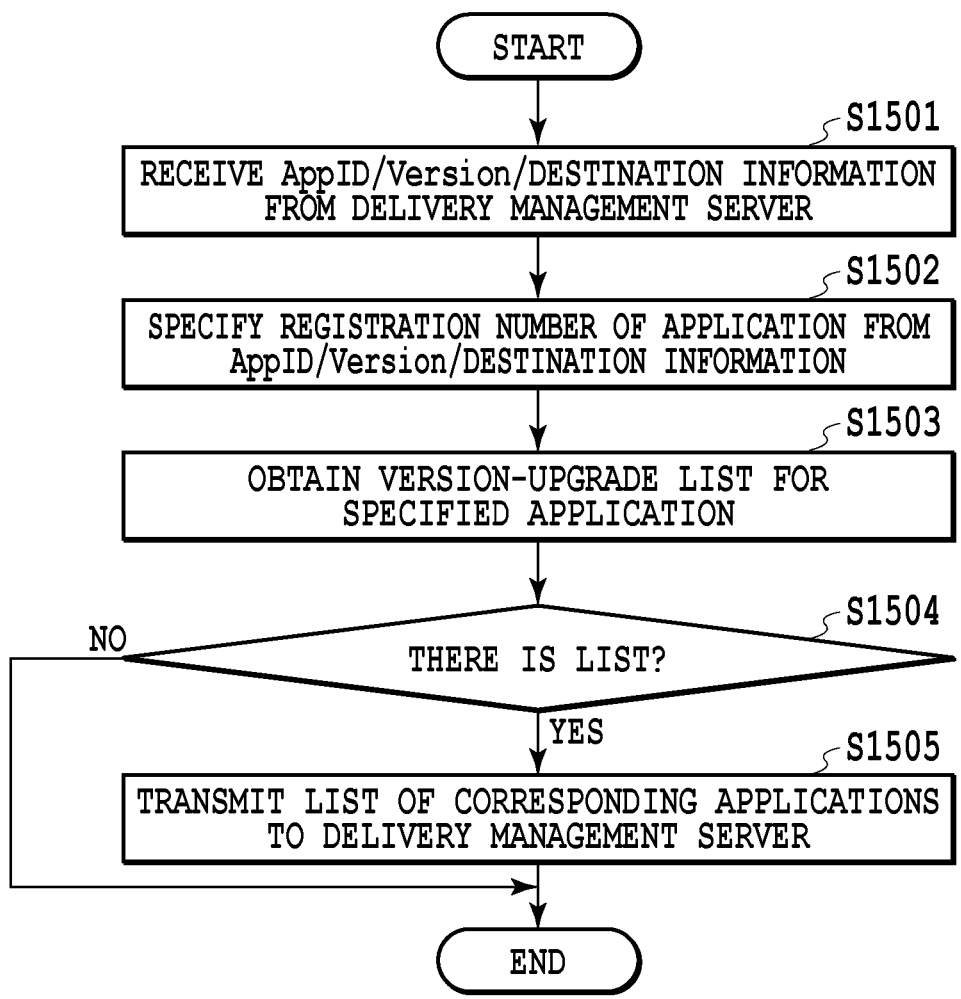
FIG. 15 is a flow chart showing a process flow for a related application information managing unit of the license management server according to the embodiment.

FIG. 15 shows a process flow for the related application information managing unit 112 of the license management server 110. In step S1501, the related application information managing unit 112 receives the AppID, Version, and delivery information from the delivery management server 140. This processing corresponds to the processing in S240 of FIG. 2.

Next, in step S1502, the related application information managing unit 112 specifies the registration number of the corresponding application managed by the license management server 110 based on the AppID, Version, and destination information received in step S1501. Next, in step S1503, the related application information managing unit 112 obtains the upgrade list set for the application whose registration number is specified in step S1502. Next, in step S1504, the related application information managing unit 112 determines whether the upgrade list exists, and if the list exists, transmits the list of corresponding applications to the delivery management server 140 in step S1505. If the list does not exist, the process ends.

FIGS. 16A and 16B are diagrams showing a relationship between applications managed by the related application information managing unit 112 of the license management server 110. The delivery management server 140 is notified of the list of related applications. Although the AppIDs of the applications are "ABC1234" and the versions of the applications are "V1.0," for example, it can be understood that the applications are registered per different destination as shown in FIGS. 16A and 16B. For example, an application 1601 in which the destination information is "JP" and the registration number is "1000" and an application 1651 in which the destination information is "EN" and the registration number is "2000" are registered and managed. The application in which the registration number is "1000" is associated with an application 1602 in which the version is "2.0" and the registration number is "1001." The application in which the registration number is "1000" is associated with an application 1603 in which the version is "3.0" and the registration number is "1002" and an application 1605 in which the version is "4.0" and the registration number is "1004." In the meantime, it is shown that the application in which the registration number is "1000" is not associated with an application 1604 in which the version is "3.1" and the registration number is "1003."

The application in which the registration number is "2000" is associated with an application 1652 in which the version is "1.1" and the registration number is "2001," an application 1653 in which the version is "1.2" and the registration number is "2002," and an application 1654 in which the version is "1.3" and the registration number is "2003." In the meantime, it is shown that the application in which the registration number is "2000" is not associated with an application 1655 in which the version is "2.0" and the registration number is "2004."

Even in a case where the AppID maintains the uniqueness of the applications in the image forming device 130, the applications having the different destination information may exist as shown in FIGS. 16A and 16B. Even in a case where the applications have the same AppID, the updatable applications may vary according to the destinations of the applications. In the present embodiment, even in this case, update of the application can be performed appropriately. Specifically, the ID of the application installed on the image forming device 130 and the hash value of the common key for the application are used for specifying the destination information. The delivery management server 140 specifies the destination information on the application by using the above information. By obtaining a list of updatable applications according to the destination information on the application, the delivery management server 140 can perform appropriate update setting of the applications installed on the image forming device 130 in performing the delivery setting.

Second Embodiment

In the first embodiment, explanation has been made on the example in which the destination information is specified and the application update setting suitable for the applications installed on the image forming device is performed by using the list of updatable applications corresponding to the specified destination information. In the second embodiment, explanation will be made on an example in which the application installed on the image forming device is updated to an application having destination corresponding to the operating user performing the delivery setting.

FIG. 17A shows a destination confirmation screen displayed by the delivery information setting unit 142 of the delivery management server 140. In a case where in the target device search result screen, there exists the image forming device on which an application whose destination is different from that of the operating user is installed as shown in FIG. 10B, the delivery information setting unit 142 displays the screen as shown in FIG. 17A. An application destination confirmation screen 1701 displays information for specifying the image forming device on which the application whose destination is different from that of the operating user is installed and the destination information on the installed application. Further, the application destination confirmation screen 1701 displays a confirmation message as to whether to update the application to the application having the same destination information as the operating user, and includes an OK button 1702 for executing the delivery setting and a Cancel button 1703 for cancelling the delivery setting.

FIG. 17A shows an example in which a user whose destination is "JP" logs in as the operating user and the application in which the destination is "EN" is installed on only the image forming device in which the device ID is "AAA00502" as shown in FIG. 10B. Incidentally, in a case where there are a plurality of image forming devices whose destinations are different from that of the operating user, the image forming devices may be displayed in a list or may be displayed in another screen.

FIG. 17B shows a delivery setting registration screen 1751 displayed by the delivery information setting unit 142 of the delivery management server 140. FIG. 17B shows an example of the screen displayed in the case of selecting to update the application according to the destination of the operating user in the application destination confirmation screen 1701 shown in FIG. 17A. More specifically, FIG. 17B shows an example of the screen in the case of pressing the OK button 1702 in FIG. 17A. Incidentally, the delivery setting registration screen 1751 shown in FIG. 17B and the delivery setting registration screen 1201 shown in FIG. 12 include common portions, and the same reference numeral is used for the same portion. Differences will be explained below.

The delivery setting registration screen 1751 includes setting 1752 performing delivery registration for the device ID "AAA00502" on which the application having "EN" destination is installed. Further, the delivery setting registration screen 1751 displays a message 1753 in a case where the application whose destination is different from that of the operating user is updated to the application whose destination is identical to that of the operating user. In the example of FIG. 17B, it is shown that the application whose destination is "EN" in the image forming device 130 having the device ID "AAA00502" is updated to the application whose destination is "JP."

<Process Flow for the Delivery Setting of the Delivery Management Server>

Figure 18:
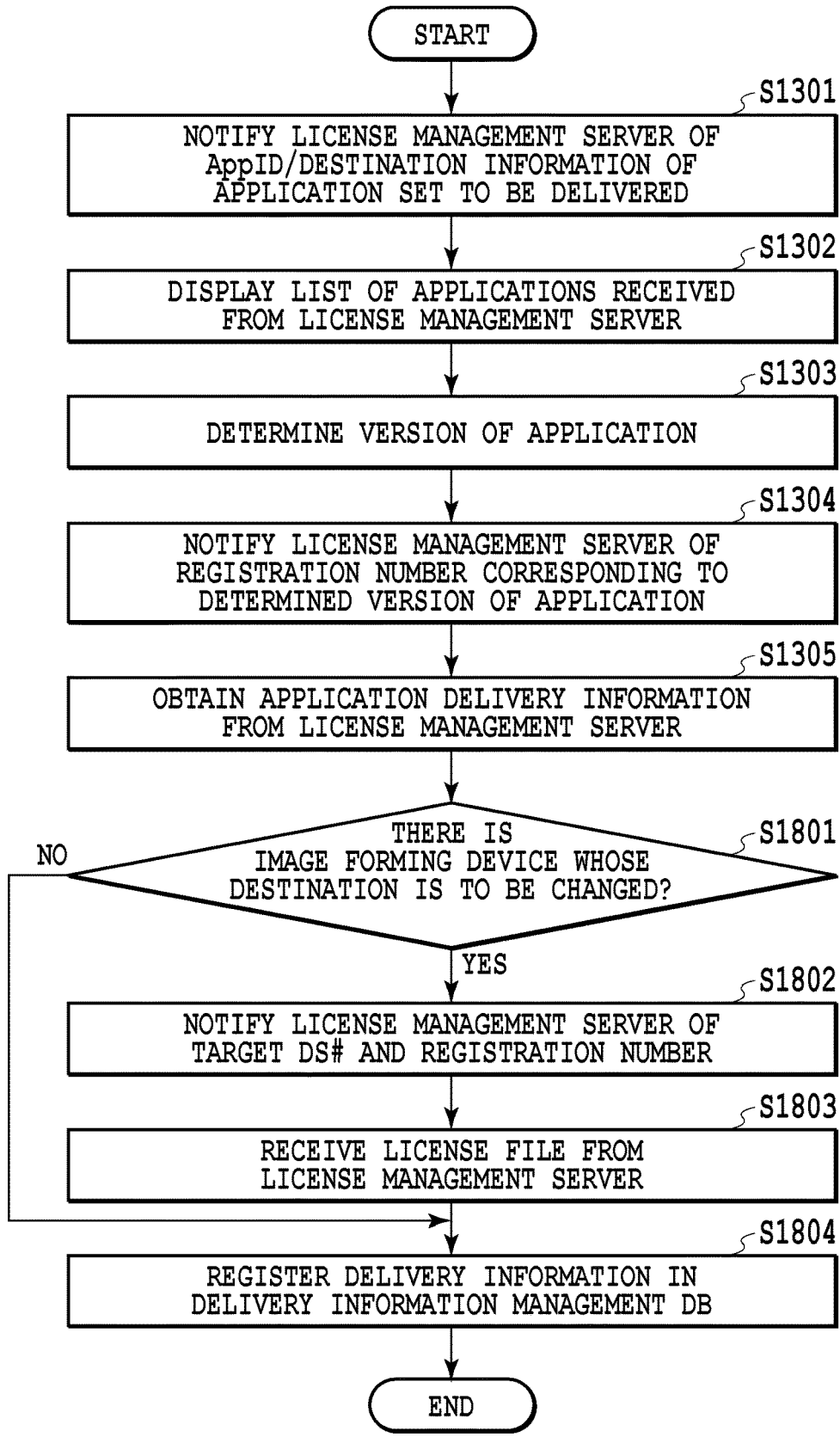
FIG. 18 is a flow chart showing an entire process flow for making delivery setting of the delivery management server according to the second embodiment.

FIG. 18 shows an entire process flow for the delivery setting of the delivery management server 140. Processing shown in FIG. 18 and the processing shown in FIG. 13 include common processing. The same reference numeral is used for the same processing, and its explanation will be omitted. More specifically, processing in steps S1301 to S1306 is identical to the processing explained in the first embodiment.

In a case where the delivery information corresponding to the destination information on the operating user is obtained in step S1305, the process proceeds to step S1801. In step 1801, the delivery information setting unit 142 determines whether there is an image forming device whose destination is to be changed. More specifically, it is determined whether out of image forming devices selected in FIG. 17B, there is an image forming device in which the destination of the application is to be changed. In the example shown in FIG. 17B, the application in which the destination information is "EN" is installed on the image forming device having the device ID "AAA00502," and accordingly, if it is determined that the destination is to be changed, the process proceeds to step S1802. If the destination is not changed, the process proceeds to step S1804.

Next, in step S1802, the delivery information setting unit 142 notifies the license management server 110 of identification information (DS#) for uniquely specifying the image forming device whose destination is to be changed and the registration number of the application. In the license management server 110, the license information issuing unit 114 generates a license file corresponding to the application and the image forming device. In step S1803, the delivery information setting unit 142 receives the license file from the license management server 110.

Thereafter, in step S1804, the delivery information setting unit 142 registers the delivery information in the delivery information management database 144. The registered delivery information is the delivery information obtained in step S1305, and further, in a case where the license file is received in step S1803, the delivery information including the license file is registered.

<Process Flow for the License Management Server>

Figure 19:
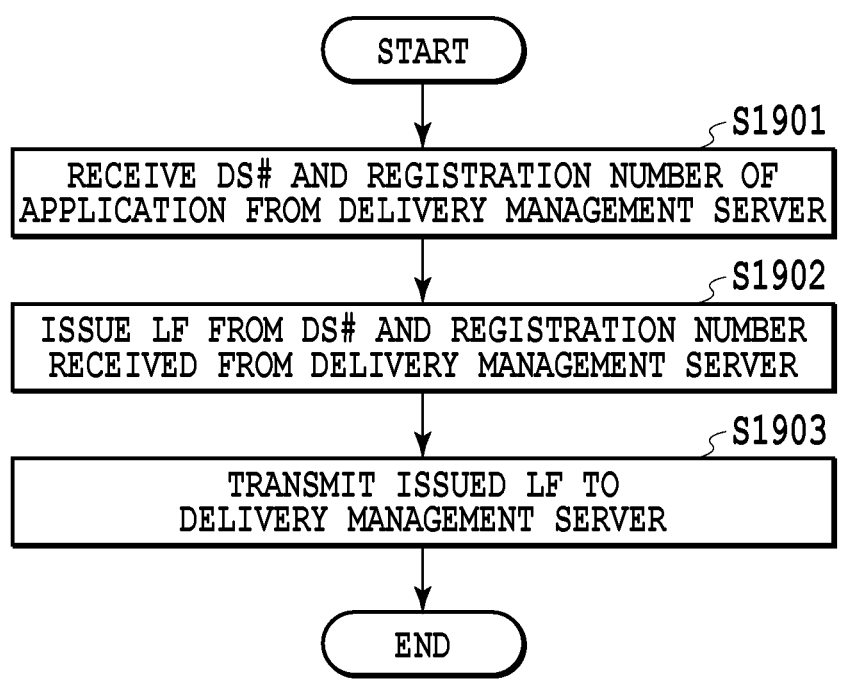
FIG. 19 is a flow chart showing a process flow for a license information issuing unit of the license management server according to the second embodiment.

FIG. 19 shows a process flow for the license information issuing unit 114 of the license management server 110. In step S1901, the license information issuing unit 114 receives the identification information DS# on the image forming device and the registration number of the application from the delivery management server 140. In step S1902, the license information issuing unit 114 issues the license file based on the identification information DS# of the image forming device and the registration number of the application received in step S1901. Then in step S1903, the license information issuing unit 114 transmits the issued license file to the delivery management server 140.

<Process Flow for the Image Forming Device>

Figure 20:
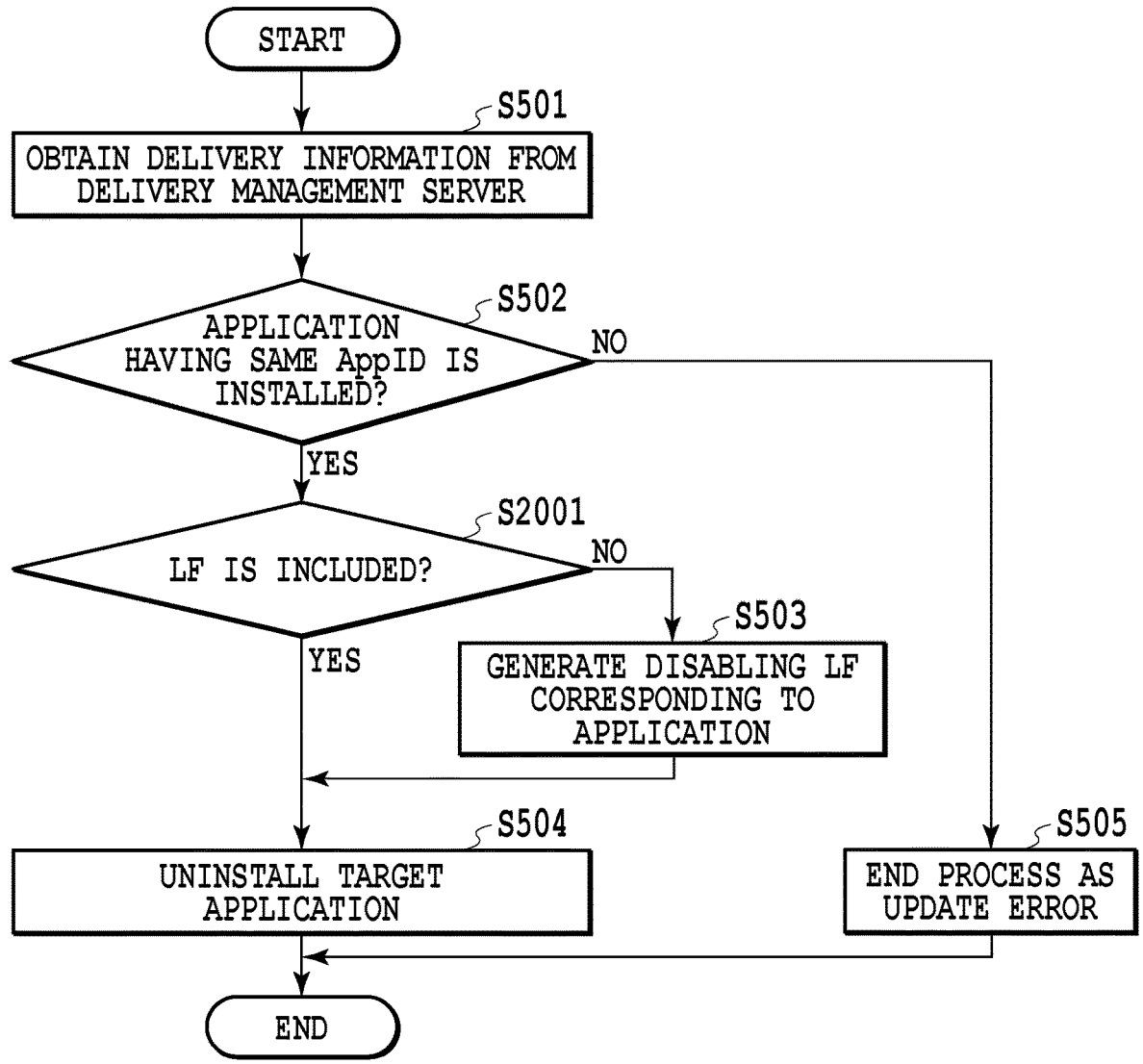
FIG. 20 is a flow chart showing a process flow for a license file obtaining unit of the image forming device according to the second embodiment.

Next, explanation will be made on processing relating to installation of the application on the image forming device. FIG. 20 shows a process flow for the license file obtaining unit 134 of the image forming device 130. In FIG. 20, the same reference numeral is used for the same processing as that of FIG. 5, and explanation thereof will be omitted.

In the present embodiment, the delivery information obtained from the delivery management server is, for example, information shown in Table 10. The image forming device can obtain, as the information for specifying the application, the application name and the URI for downloading the application as well as the AppID/Version. Further, some application may include the license file (LF).

TABLE 10

| Application Name | AppID | Version | URI | LF |
|---|---|---|---|---|
| Hello | ABC1234 | V1.0 | http://www.xxxx.co.jp/1234 | ABC.lic |
| Sample | CDE5678 | V2.0 | http://www.xxxx.co.jp/5678 | |

In a case where the application whose AppID is identical to the AppID obtained in step S502 is installed on the own image forming device 130, the process proceeds to step S2001. In step S2001, the license file obtaining unit 134 determines whether the license file is included in the delivery information obtained in step S501. In a case where the license file is included, the process proceeds to step S504, and the target application is uninstalled. More specifically, since the license file is included, the target application is uninstalled without generating the disabling license file. In the case of Table 10, since the license file is included in the application whose AppID is "ABC1234," the disabling license file is not generated for the application whose AppID is "ABC1234," and the disabling license file is generated only for the application whose AppID is "CDE5678."

Figure 21:
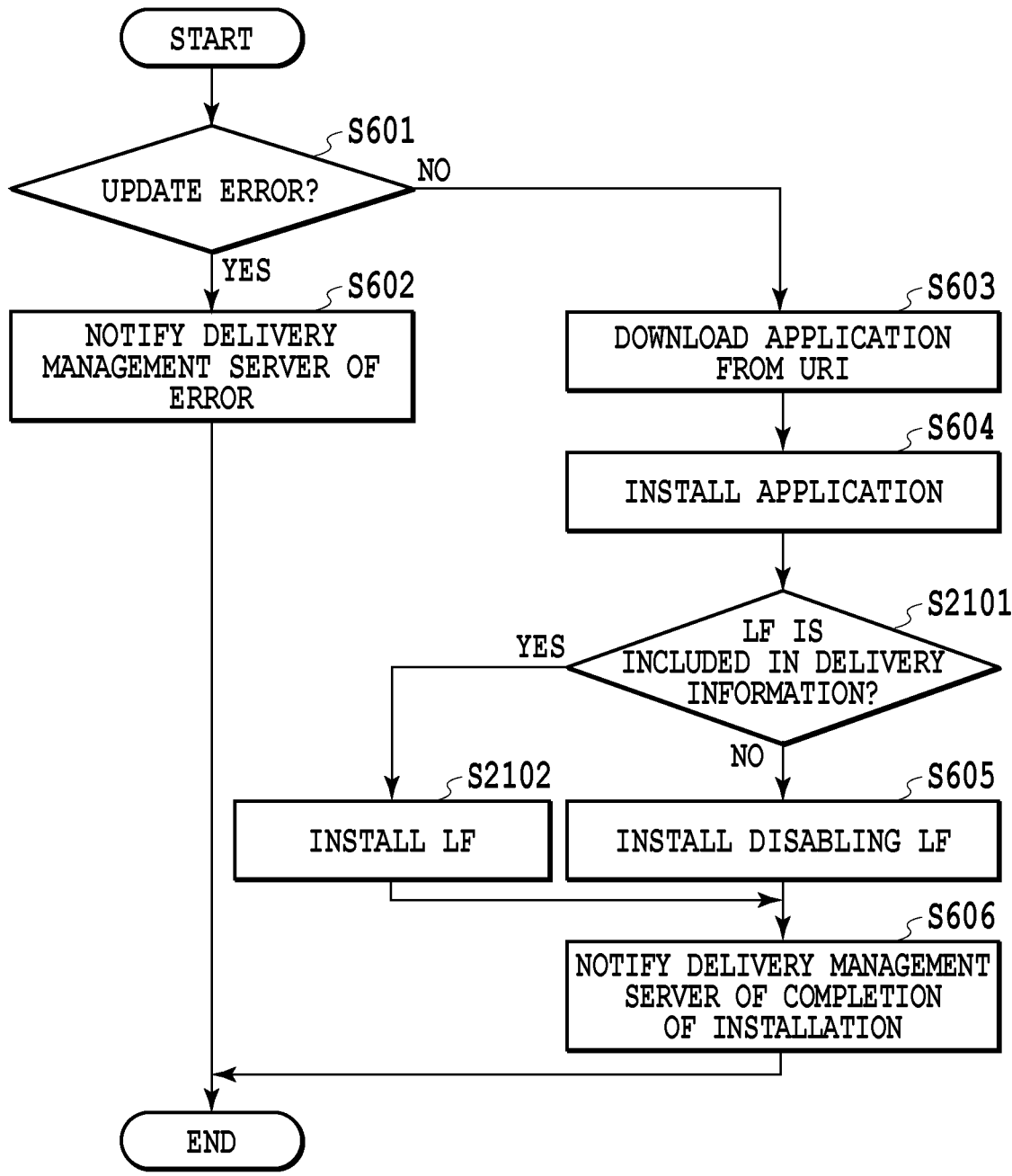
FIG. 21 is a flow chart showing a process flow for the installing unit of the image forming device according to the second embodiment.

FIG. 21 shows a process flow for the installing unit 135 of the image forming device 130. The same reference numeral is used for the same processing in FIG. 21 as that of FIG. 6, and explanation thereof will be omitted. After installing the application in step S604, the installing unit 135 determines whether the license file is included in the delivery information in step S2101. In a case where the license file is included, the process proceeds to step S2102, and the installing unit 135 installs the license file included in the delivery information. In a case where the license file is not included, as explained in the first embodiment, the installing unit 135 installs the disabling license file obtained by the license file obtaining unit 134 in step S605.

In the present embodiment, as shown in FIGS. 17A and 17B, in a case where the application having the destination information different from the destination of the operating user who performs the delivery setting is installed on the image forming device 130, the application can be updated according to the destination of the operating user. Accordingly, it becomes possible to manage the image forming device 130 according to the destination of the operating user.

According to the above-described embodiments, it is possible to deliver the updated application to the appropriate destination.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-009740, filed Jan. 21, 2015, which is hereby incorporated by reference herein in its entirety.

What is claimed is:

1. A system comprising:
a delivery management server for managing delivery of an application;
a license management server for managing a license of the application; and
an information processing device installing the application,
wherein the information processing device comprises at least one first processor coupled to at least one first memory storing instructions,
wherein the at least one first processor executes the instructions stored in the at least one first memory, causing the at least one first processor to perform operations comprising:
(1) transmitting (a) application identification information for identifying the application and (b) a hash value of a key used for decrypting the application which was encrypted, and
(2) notifying the delivery management server of a result of installation of the application which was updated,
wherein the delivery management server comprises at least one second processor, at least one second memory storing instructions coupled to the at least one second processor, and a managing database,
wherein the at least one second processor executes the instructions stored in the at least one second memory, causing the at least one second processor to perform operations comprising:
(1) a first receiving process of receiving, from the information processing device, (a) the application identification information and (b) the hash value of the key;
(2) a first transmitting process of transmitting, to the license management server, the application identification information and the hash value received in the first receiving process; and
(3) a second receiving process of receiving, from the license management server, destination information of the application, the destination information having been transmitted by the license management server in response to transmission in the first transmitting process,
(4) an associating process of associating the destination information received in the second receiving process with information managed by the managing database, the managing database being configured to manage the application identification information and the hash value received in the first receiving process in association with each other, and
(5) in a case where the application identification information is specified in a first screen for setting a delivery setting of the application, a providing process of providing a second screen used for selecting, from a list of devices including the information processing device installing the application identified by the application identification information, a target information processing device which is a target of delivery, wherein (a) the second screen used for selecting is generated based on the information managed by the managing database, and (b) the second screen used for selecting is configured such that the target information processing device installing the application whose destination is different from that of an operating user is disabled from being selected as the target of delivery, and wherein the license management server comprises at least one third processor, at least one third memory storing instructions coupled to the at least one third processor, and a license management database, wherein the at least one third processor of the license management server executes the instructions stored in the at least one third memory in the license management server, causing the at least one third processor of the license management server to perform operations comprising:

(1) obtaining information managed in the license management database, the license management database managing, by associating with each other, (a) the application identification information, (b) a plurality of keys, and (c) a plurality of pieces of destination information, (2) receiving the application identification information transmitted in the first transmitting process from the delivery management server to generate a plurality of hash values respectively corresponding to the plurality of keys associated with the received application identification information in the license management database, (3) in a case where there is a hash value among the generated plurality of hash values matching the hash value transmitted in the first transmitting process from the delivery management server, specifying destination information managed in association with a key corresponding to the matched hash value, and (4) transmitting the specified destination information to the delivery management server.

2. The system according to claim 1, wherein the at least one second processor of the delivery management server further executes the instructions stored in the at least one second memory to perform operations comprising:

a third transmitting process of transmitting, to the license management server, the application identification information determined according to the input from the operating user and the destination corresponding to the operating user;

a third receiving process of receiving a list of update candidates transmitted from the license management server in response to transmission in the third transmitting process;

a fourth transmitting process of transmitting, to the license management server, a designation of an application to be updated designated by the operating user using the list received in the third receiving process;

a fourth receiving process of receiving delivery information on the application to be updated transmitted from the license management server in response to transmission in the fourth transmitting process; and a delivery process of delivering the delivery information received in the fourth receiving process to the selected target information processing device.

3. The system according to claim 2, wherein in the delivery process, the at least one second processor of the delivery management server further executes the instructions stored in the at least one second memory to cause the at least one second processor to perform delivering the delivery information in response to an inquiry about the delivery information from the target information processing device.

4. The system according to claim 2, wherein in the providing process, the at least one second processor of the delivery management server further executes the instructions stored in the at least one second memory to cause the at least one second processor to perform operations comprising (1) determining the target information processing device installing the application whose destination is different from that of the operating user, and (2) determining whether to install the application corresponding to the destination of the operating user on the target information processing device installing the application whose destination is different from that of the operating user according to the input from the operating user, wherein the at least one second processor of the delivery management server further executes the instructions stored in the at least one second memory to cause the at least one second processor to perform operations comprising (1) a fifth transmitting process of transmitting, to the license management server, (a) second device identification information for identifying the target information processing device installing the application whose destination is different from that of the operating user and (b) a registration number for uniquely specifying the application to be updated at the license management server in a case where it is determined to install the application corresponding to the destination of the operating user to the device installing the application whose destination is different from that of the operating user, and (2) a fifth receiving process of receiving a license file for the application to be updated transmitted from the license management server in response to transmission in the fifth transmitting process, and wherein in the delivery process, the at least one second processor of the delivery management server executes the instructions stored in the at least one second memory to cause the at least one second processor to perform delivering delivery information including the license file received in the fifth receiving process.

5. The system according to claim 1, wherein the at least one third processor of the license management server further executes the instructions stored in the at least one third memory in the license management server to cause the at least one third processor of the license management server to perform operations comprising:

receiving the application identification information and the destination information from the delivery management server;

transmitting, to the delivery management server, a list of update candidates corresponding to the destination information;

receiving designation of an application to be updated from the delivery management server; and transmitting, to the delivery management server, delivery information including a delivery destination of the application to be updated.

6. The system according to claim 1, wherein the at least one first processor further executes the instructions stored in the at least one first memory to cause the at least one first processor to perform operations comprising:

obtaining, from the delivery management server, delivery information including a delivery destination of the application to be updated; and installing the application to be updated on the information processing device by using the obtained delivery information.

7. The system according to claim 6, wherein in a case where a license file is not included in the delivery information, in the installing process, the at least one first processor executes the instructions stored in the at least one first memory to cause the at least one first processor to perform operations comprising (a) disabling the installed application, (b) generating a license file, and (c) performing installation by using the generated license file, and wherein in a case where a license file is included in the delivery information, in the installing process, the at least one first processor executes the instructions stored in the at least one first memory to cause the at least one first processor to perform installation by using the license file included in the delivery information.

8. A method in a system comprising (a) a delivery management server for managing delivery of an application, (b) a license management server for managing a license of the application, and (c) an information processing device installing the application, wherein the information processing device performs:
(1) transmitting (a) application identification information for identifying the application and (b) a hash value of a key used for decrypting the application which was encrypted, and
(2) notifying the delivery management server of a result of installation of the application which was updated, wherein the delivery management server, which comprises a managing database, performs:
(1) a first receiving step of receiving, from the information processing device, (a) the application identification information and (b) the hash value of the key;
(2) a first transmitting step of transmitting, to the license management server, the application identification information and the hash value received in the first receiving step;
(3) a second receiving step of receiving, from the license management server, destination information of the application, the destination information having been transmitted by the license management server in response to transmission in the first transmitting step;
(4) an associating step of associating the destination information received in the second receiving step with information managed by the managing database, the managing database being configured to manage the application identification information and the hash value received in the first receiving step in association with each other; and
(5) in a case where the application identification information is specified in a first screen for setting a delivery setting of the application, a providing step of providing a second screen used for selecting, from a list of devices including the information processing device installing the application identified by the application identification information, a target information processing device which is a target of delivery, wherein (a) the second screen used for selecting is generated based on the information managed by the managing database, and (b) the second screen used for selecting is configured such that the target information processing device installing the application whose destination is different from that of an operating user is disabled from being selected as the target of delivery, and wherein the license management server, which comprises a license management database, performs:
(1) obtaining information managed in the license management database, the license management database managing, by associating with each other, (a) the application identification information, (b) a plurality of keys, and (c) a plurality of pieces of destination information,
(2) receiving the application identification information transmitted in the first transmitting step from the delivery management server to generate a plurality of hash values respectively corresponding to the plurality of keys associated with the received application identification information in the license management database,
(3) in a case where there is a hash value among the generated plurality of hash values matching the hash value transmitted in the first transmitting step in the delivery management server, specifying destination information managed in association with a key corresponding to the matched hash value, and
(4) transmitting the specified destination information to the delivery management server.

* * * * *